(12) United States Patent
Wiegman

(10) Patent No.: US 11,964,780 B2
(45) Date of Patent: Apr. 23, 2024

(54) SYSTEMS AND METHODS FOR IN-FLIGHT OPERATIONAL ASSESSMENT

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

(*) Notice: Subject to any disclaimer, the term of this patent is extended or adjusted under 35 U.S.C. 154(b) by 65 days.

(21) Appl. No.: 17/349,182

(22) Filed: Jun. 16, 2021

(65) Prior Publication Data

US 2021/0309392 A1 Oct. 7, 2021

Related U.S. Application Data

(63) Continuation-in-part of application No. 16/599,538, filed on Oct. 11, 2019.

(Continued)

(51) Int. Cl.
*B64F 5/60* (2017.01)
*B64C 29/00* (2006.01)
(Continued)

(52) U.S. Cl.
CPC .............. *B64F 5/60* (2017.01); *B64C 29/00* (2013.01); *B64D 27/24* (2013.01); *B64D 31/06* (2013.01); *B64D 2221/00* (2013.01)

(58) Field of Classification Search
CPC ........ B64D 45/00; B64D 43/00; B64D 47/00; B64D 2045/0085; B60L 1/00;
(Continued)

(56) References Cited

U.S. PATENT DOCUMENTS 6,542,077 B2 4/2003 Joao
7,058,484 B1 6/2006 Potega
(Continued)

FOREIGN PATENT DOCUMENTS

KR 1020130096443 A 8/2013
WO 9626472 A1 8/1996
WO 2015196259 12/2015

OTHER PUBLICATIONS

Beard, Randel et al. "Semi-Autonomous Human-UAV Interfaces for Fixed-Wing Mini-UAVs", Oct. 1, 2004, Brigham Young University Faculty Publications, (Year: 2004).*

(Continued)

*Primary Examiner* — James M McPherson
*Assistant Examiner* — Kyle J Kingsland
(74) *Attorney, Agent, or Firm* — Brake Hughes Bellermann LLP

(57) ABSTRACT

A method of in-flight operational assessment for an electric aircraft comprising detecting by a sensor an electrical parameter of an energy source. The method further includes receiving by a controller the electrical parameter from the sensor and determining a power-production capability of the energy source, using the electrical parameter. The method further includes calculating, by the controller, a projected power-consumption need of the electric aircraft and comparing the determined power-production capability of the energy source to the projected power-consumption need. The method includes generating a power production command datum as a function of the comparison of the power-production capability and the projected power-consumption need.

20 Claims, 13 Drawing Sheets

Related U.S. Application Data

(60) Provisional application No. 62/812,215, filed on Feb. 28, 2019.

(51) Int. Cl.
 B64D 27/24 (2006.01)
 B64D 31/06 (2006.01)

(58) Field of Classification Search
 CPC .. B60L 58/16; B60L 2200/10; B64C 29/0025; B64F 5/60; G07C 5/06
 See application file for complete search history.

(56) References Cited

U.S. PATENT DOCUMENTS

| | | |
|---|---|---|
| 7,131,136 B2 | 10/2006 | Monroe |
| 8,447,441 B2 | 5/2013 | Calvignac et al. |
| 8,493,906 B1 | 7/2013 | Troxel et al. |
| 8,515,656 B2 | 8/2013 | Reed et al. |
| 8,527,240 B2 | 9/2013 | Scheid et al. |
| 9,057,627 B2 | 6/2015 | Shaw |
| 9,327,600 B1 | 5/2016 | Nehmeh |
| 9,379,418 B2 | 6/2016 | Wang et al. |
| 9,434,267 B2 | 9/2016 | Wang et al. |
| 9,602,187 B2 | 3/2017 | Jacobs et al. |
| 9,658,291 B1 | 5/2017 | Wang et al. |
| 9,742,042 B2 | 8/2017 | Wang et al. |
| 9,880,061 B2 | 1/2018 | Wang et al. |
| 9,902,495 B2 | 2/2018 | Phan et al. |
| 9,914,536 B2 | 3/2018 | Rossotto |
| 2011/0184590 A1 | 4/2011 | Duggan |
| 2014/0032034 A1 | 1/2014 | Raptopoulos |
| 2018/0039271 A1* | 2/2018 | Rimoux ............... G05D 1/0653 |
| 2018/0061247 A1 | 3/2018 | Brown et al. |
| 2018/0208305 A1* | 7/2018 | Lloyd ................... B60L 50/90 |
| 2020/0254900 A1* | 8/2020 | Kumar ..................... H02P 5/74 |

OTHER PUBLICATIONS

B Bole, K Goebel. QC Chi, E Hogge, Battery Charge Depletion Prediction on an Electric Aircraft, Oct. 1, 2013.

Abdullah Alnaqeb, Online prediction of battery discharge and flight mission assessment for electrical rotorcraft, Jan. 1, 2017.

PCT/US20/19969; International Search Report; dated Jun. 22, 2020; By: Authorized Officer Lee Young.

* cited by examiner

SYSTEMS AND METHODS FOR IN-FLIGHT OPERATIONAL ASSESSMENT

CROSS-REFERENCE TO RELATED APPLICATIONS

This application is a continuation-in-part of and claims the benefit of priority to U.S. patent application Ser. No. 16/599,538, filed on Oct. 11, 2019, and titled "SYSTEMS AND METHODS FOR IN-FLIGHT OPERATIONAL ASSESSMENT" which in incorporated by reference herein in its entirety, which claims the benefit of priority to U. S. Provisional Patent Application Ser. No. 72/812,215, filed on Feb. 28, 2019, and titled "METHODS AND SYSTEMS FOR IN-FLIGHT OPERATIONAL ASSESSMENT," which is incorporated by reference herein in its entirety.

FIELD OF THE INVENTION

The present invention generally relates to an in-flight assessment of the power output capability of an energy source incorporated into an electrically powered aircraft during flight. In particular, the present invention is directed to methods and systems for in-flight operational assessment.

BACKGROUND

During flight, an electric aircraft will utilize energy and power from the onboard energy source thus reducing the overall capability of the energy source to deliver power or energy. During landing, there is a high peak power demand on the energy source which is needed to provide a controlled vertical descent. There may exist situations where the energy source may not be able to supply adequate power for landing following the originally planned or modified flight mission due to the demand and use of the energy source during takeoff and cruising activities. As a result, a safe and accurate landing may not be achievable and can present a serious impediment to the use of such aircraft for transportation of passengers or cargo.

SUMMARY OF THE DISCLOSURE

In one aspect, a system for in-flight operational assessment configured for use in an electric aircraft. The system includes an energy source mechanically coupled to an electric aircraft, wherein the energy source is configured to power at least a portion of the electric aircraft. The system includes a sensor mechanically coupled to the electric aircraft, wherein the sensor is configured to detect an electrical parameter of the energy source. The system includes a controller communicatively connected to the sensor, wherein the controller is designed and configured to receive the electrical parameter of the energy source from the sensor, determine, using the electrical parameter, a power-production capability of the energy source, calculate a projected power-consumption need of the electric aircraft, compare the determined power-production capability of the energy source to a projected power-consumption need and generate, as a function of the comparison of the power-production capability and the projected power-consumption need, a power production command datum wherein, the power production command is configured to alter the energy source.

In another aspect, a method of in-flight operational assessment configured for use in electric aircraft. The method includes detecting, by a sensor, an electrical parameter an energy source of an electric aircraft. The method includes receiving, by a controller, the electrical parameter of the energy source from the sensor. The method includes determining, by the controller, a power-production capability of the energy source, using the electrical parameter. The method includes calculating, by the controller, a projected power-consumption need of the electric aircraft. The method includes comparing, by the controller, the determined power-production capability of the energy source to a projected power-consumption need. The method includes generating, by the controller, as a function of the comparison of the power-production capability and the projected power-consumption need, a power production command datum, wherein the power production command is configured to alter the energy source.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for in-flight operational assessment. Embodiments of the systems and methods disclosed herein describe an in-flight operational assessment of an energy source for an electric aircraft by a novel process which determines whether energy source power output capability is sufficient for a landing protocol. In an embodiment, the power output capability of an energy source is determined by measuring an electrical parameter with a sensor communicatively connected to energy source and deducing potential power output, which is compared with the energy required to safety land the aircraft at a chosen position or perform some other part of a flight plan. Embodiments may include a method for modifying a flight plan, for instance by changing to a different landing site and/or method depending on the power output during flight.

Figure 1:
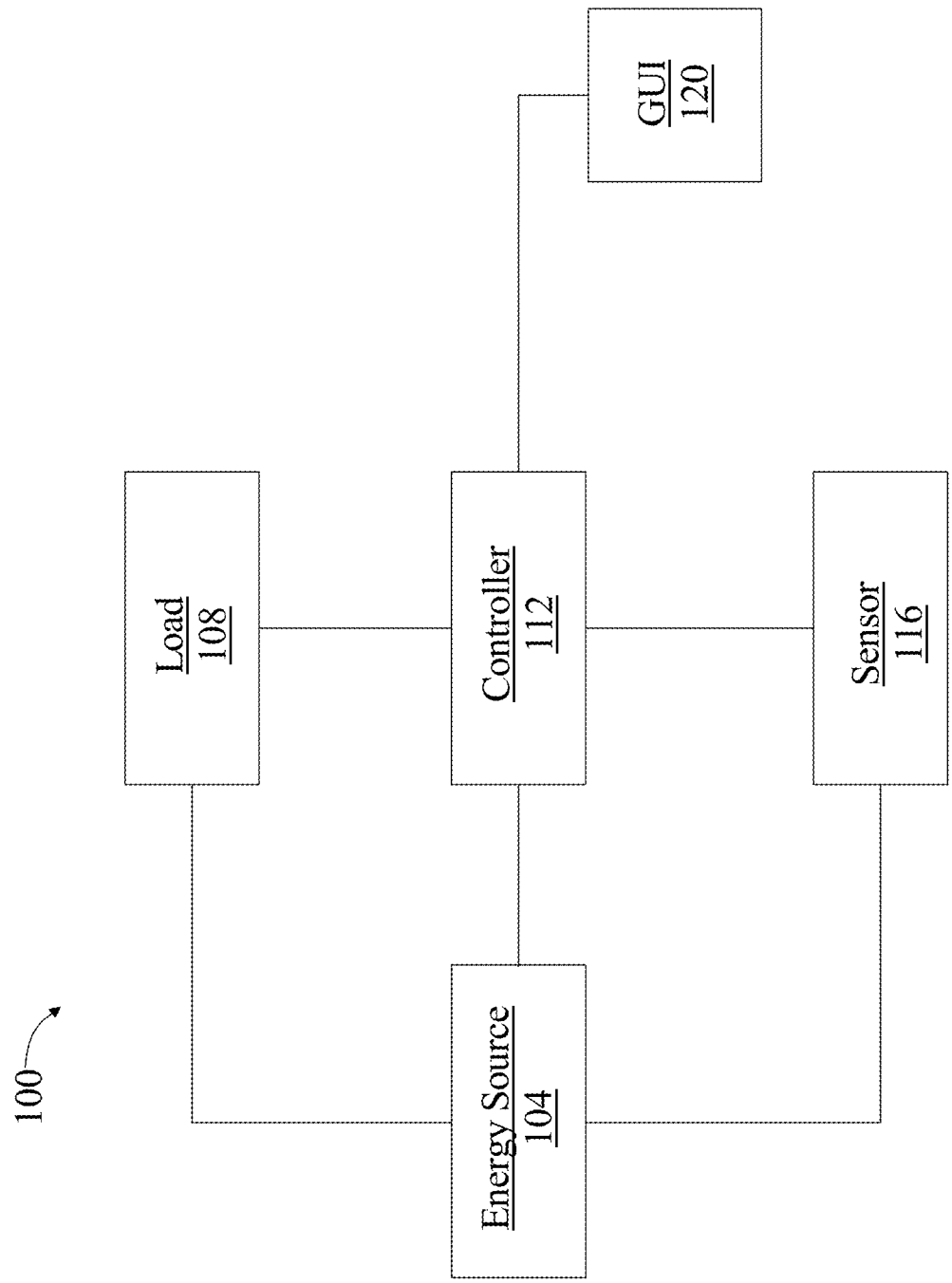
FIG. 1 is a block diagram depicting an exemplary embodiment of a system for in-flight operational assessment.

Referring now to FIG. 1, an illustration of an embodiment of in-flight operational assessment (IFOA) system 100 is presented. IFOA system 100 may be configured to display at least an element of the power-production capability of the energy source based upon the comparison of the power-production capability and the projected power-consumption need. IFOA system 100 can include energy source 104, load 108, controller 112, sensor 116, GUI 120, or any combination thereof. IFOA system 100 may be incorporated in an electric aircraft or other electrically powered vehicle, for instance as described below. IFOA system 100 may be further incorporated into a vertical takeoff and landing aircraft, for instance as described below.

With continued reference to FIG. 1, in-flight operational system 100 includes an energy source 104 which can be mechanically coupled to an electric aircraft. As used herein, "mechanically coupled" is a process whereby one device, component, or circuit is used to connect two shafts together at their ends for the purpose of transmitting power. In an embodiment, mechanical coupling is used to connect the ends of adjacent parts and/or objects of the electric aircraft. In an embodiment, mechanical coupling is used to join two pieces of rotating electric aircraft components. As an example and without limitation, mechanical coupling may include rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupler, sleeve coupling, tapered shaft lock, twin spring coupling, rag joint coupling, universal joints, and the like.

Energy source 104 of IFOA system 100 is configured to power at least a portion of an electric vehicle and can include, without limitation, a cell. Energy source 104 may include, without limitation, a generator, a photovoltaic device, a battery cell, a fuel cell such as a hydrogen fuel cell, direct methanol fuel cell, and/or solid oxide fuel cell, or an electric energy storage device; electric energy storage device may include without limitation a capacitor and/or a battery. A person of skill in the art will appreciate that energy source 104 may be designed as to meet the energy or power requirement of various electric vehicles on which IFOA system 100 may be integrated. A person of ordinary skill in the art will further appreciate that energy source 104 can be designed to fit within a designated footprint on the various electric aircraft on which IFOA system 100 may be integrated.

Still referring to FIG. 1, in an embodiment, energy source 104 may be used to provide consistent electrical power to load 108 during the travel of an electric aircraft, such as during the flight. Energy source 104 may be capable of providing sufficient power for "cruising" and other relatively low-power phases of flight, wherein cruising may consume much energy of the energy source 104. Further, energy source 104 can also provide electrical power for some higher-power phases of flight as well, particularly when the energy source 104 is at a high state of charge (SOC), as may be the case for instance during takeoff. Energy source 104 may be capable of providing sufficient electrical power for auxiliary loads including without limitation, lighting, navigation, communications, de-icing, steering or other systems requiring power or energy. Energy source 104 may be capable of providing sufficient power for controlled descent and landing protocols, including, without limitation, hovering descent or runway landing. As used herein, an energy source 104 may have high power density wherein the electrical power the energy source can usefully produce per unit of volume, and/or mass, is relatively high. Energy source 104 may include a device for which power that may be produced per unit of volume and/or mass has been optimized, at the expense of the maximal total specific energy density or power capacity, during design.

Continuing to refer to FIG. 1, non-limiting examples of items that may be used as an energy source 104 may include batteries used for starting applications including lithium-ion batteries which may include nickel cobalt aluminum (NCA), nickel manganese cobalt (NMC), lithium iron phosphate (LiFePO4), lithium cobalt oxide (LCO), and/or lithium manganese oxide (LMO) batteries, and the like. In some embodiments, said lithium ion batteries can be mixed with another cathode chemistry in order to provide more specific power as an application may require. For example, an application may require lithium metal batteries, wherein the lithium metal batteries include a lithium metal anode that provides high power on demand. An application may further require lithium ion batteries, wherein the lithium ion batteries have a silicon or titanate anode. In some embodiments, energy source 104 may be used to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology. An energy source 104 may include, without limitation, lead-based batteries such as without limitation lead acid batteries, metal-air batteries, or any other suitable battery. A battery may further include, without limitation, lithium sulfur batteries, magnesium ion batteries, and/or sodium ion batteries. Batteries may include solid state batteries or supercapacitors or another suitable energy source. Batteries may be primary or secondary or a combination of both. Persons skilled in the art, upon reviewing the entirety of this disclosure, will be aware of various devices of components that may be used as energy source 104.

Referring again to FIG. 1, an energy source 104 may be mechanically coupled to a load 108. The load 108 may be further mechanically coupled to a controller. Load 108 may be any device or component that consumes electrical power on demand. Load 108 may include one or more propulsive devices, including without limitation one or more propellers, turbines, impellers, or other devices necessary for take-off, propelling or landing the electric aircraft during flight. The energy source 104 may supply power to the propulsive device. Load 108 may be, without limitation, in the form of a propulsive device. A propulsive device, as described herein, is a component or device used to propel a craft by exerting force on a fluid medium, which may include a gaseous medium such as air or a liquid medium such as water. A propulsive device, as described herein, may include, without limitation, a thrust element. The thrust element may include any device or component that converts the mechanical energy of a motor, for instance in the form of rotational motion of a shaft, into thrust in a fluid medium. The thrust element may include, without limitation, a device using moving or rotating foils, including without limitation one or more rotors, an airscrew or propeller, a set of airscrews or propellers such as contra-rotating propellers, a moving or flapping wing, or the like. a thrust element may include without limitation a marine propeller or screw, an impeller, a turbine, a pump-jet, a paddle or paddle-based device, or the like.

Still referring to FIG. 1, load 108 may convert electrical energy into kinetic energy; for instance, load 108 may include one or more electric motors. An electric motor, as described herein, is a device that converts electrical energy into mechanical energy, for instance by causing a shaft to rotate. An electric motor may be driven by direct current (DC) electric power. As an example and without limitation, an electric motor may include a brushed DC electric motor or the like. An electric motor may be, without limitation, driven by electric power having varied or reversing voltage levels, such as alternating current (AC) power as produced by an alternating current generator and/or inverter, or otherwise varying power, such as produced by a switching power source. An electric motor may include, for example and without limitation, brushless DC electric motors, permanent magnet synchronous an electric motor, switched reluctance motors, or induction motors. In addition to inverter and/or a switching power source, a circuit driving an electric motor may include electronic speed controllers (not shown) or other components for regulating motor speed, rotation direction, and/or dynamic braking.

With continued reference to FIG. 1, load 108 may convert electrical energy into heat. As an example and without limitation, load 108 may include resistive loads. As a further example and without limitation, load 108 may convert electrical energy into light. Load 108 may include one or more elements of digital or analog circuitry. For instance and without limitation, load 108 may consume power in the form of voltage sources to provide a digital circuit's high and low voltage threshold levels, to enable amplification by providing "rail" voltages, or the like. Load 108 may include, as a non-limiting example, control circuits, aircraft controllers and/or controllers as described in further detail below. The energy source 104 may connect to load 108 using an electrical connection enabling electrical or electromagnetic power transmission, including any conductive path from an energy source 104 to load 108, any inductive, optical or other power coupling such as an isolated power coupling, or any other device or connection usable to convey electrical energy from an electrical power, voltage, or current source. The electrical connection may include, without limitation, a distribution bus. Persons skilled in the art, upon reviewing the entirety of this disclosure, will be aware of various devices that may be used as the a load 108.

Continuing to refer to FIG. 1, the IFOA system 100 includes a controller 112. Controller 112 may include and/or communicate with any computing device as described in this disclosure, including without limitation a microcontroller, microprocessor, digital signal processor (DSP) and/or system on a chip (SoC) as described in this disclosure. Controller 112 may be installed in an aircraft, may control the aircraft remotely, and/or may include an element installed in the aircraft and a remote element in communication therewith. Controller 112 may include, be included in, and/or communicate with a mobile device such as a mobile telephone or smartphone. Controller 112 may include a single computing device operating independently, or may include two or more computing device operating in concert, in parallel, sequentially or the like; two or more computing devices may be included together in a single computing device or in two or more computing devices. Controller 112 with one or more additional devices as described below in further detail via a network interface device. Network interface device may be utilized for connecting a controller 112 to one or more of a variety of networks, and one or more devices. Examples of a network interface device include, but are not limited to, a network interface card (e. g., a mobile network interface card, a LAN card), a modem, and any combination thereof. Examples of a network include, but are not limited to, a wide area network (e. g., the Internet, an enterprise network), a local area network (e. g., a network associated with an office, a building, a campus or other relatively small geographic space), a telephone network, a data network associated with a telephone/voice provider (e. g., a mobile communications provider data and/or voice network), a direct connection between two computing devices, and any combinations thereof. A network may employ a wired and/or a wireless mode of communication. In general, any network topology may be used. Information (e. g., data, software etc.) may be communicated to and/or from a computer and/or a computing device. Controller 112 may include but is not limited to, for example, a controller or cluster of computing devices in a first location and a second computing device or cluster of computing devices in a second location. Controller 112 may include one or more computing devices dedicated to data storage, security, distribution of traffic for load balancing, and the like. Controller 112 may distribute one or more computing tasks as described below across a plurality of computing devices of computing device, which may operate in parallel, in series, redundantly, or in any other manner used for distribution of tasks or memory between computing devices. Controller 112 may be implemented using a "shared nothing" architecture in which data is cached at the worker, in an embodiment, this may enable scalability of IFOA system 100 and/or computing device.

With continued reference to FIG. 1, controller 112 may be communicatively connected to a sensor and the load 108. As used herein, "communicatively connecting" is a process whereby one device, component, or circuit is able to receive data from and/or transmit data to another device, component, or circuit; communicative connection may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may be performed via a bus or other facility for intercommunication between elements of a computing device as described in further detail below in reference to FIG. 10. Communicative connecting may include indirect connections via "wireless" connection, low power wide area network, radio communication, optical communication, magnetic, capacitive, or optical coupling, or the like. Controller 112 may include any computing device or combination of computing devices as described in detail below in reference to FIG. 10. Controller 112 may include any processor or combination of processors as described below in reference to FIG. 10. Controller 112 may include a microcontroller. Controller may be incorporated in the electric aircraft or may be in remote contact.

Still referring to FIG. 1, controller 112 may be communicatively connected, as defined above, to the load 108. As used herein, controller 112 is communicatively connected to the load wherein controller 112 is able to transmit signals to the load and the load is configured to modify an aspect of load behavior in response to the signals. As a non-limiting example, controller 112 may transmit signals to load 108 via an electrical circuit connecting controller 112 to the load 108. As an example and without limitation, the circuit may include a direct conductive path from controller 112 to the load or may include an isolated coupling such as an optical or inductive coupling. Alternatively or additionally, controller 112 may communicate with the load 108 using wireless communication, such as without limitation communication performed using electromagnetic radiation including optical and/or radio communication, or communication via magnetic or capacitive coupling. Persons skilled in the art will be aware, after reviewing the entirety of this disclosure, of many different forms and protocols of communication that may be used to communicatively couple controller 112 to a load 108.

In an embodiment and still referring to FIG. 1, controller 112 may include a reconfigurable hardware platform. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform may be reconfigured to enact any algorithm and/or algorithm selection process received from another computing device and/or created using machine-learning and/or neural net processes as described below.

In an embodiment and continuing to refer to FIG. 1, where in-flight operational assessment IFOA system 100 is incorporated into an electric aircraft, controller 112 is programmed to operate electronic aircraft to perform a flight maneuver. As described herein, at least a flight maneuver may include takeoff, landing, stability control maneuvers, emergency response maneuvers, regulation of altitude, roll, pitch, yaw, speed, acceleration, or the like during any phase of flight. As an example and without limitation, at least a flight maneuver may include a flight plan or sequence of maneuvers to be performed during a flight plan. As a further example and without limitation, at least a flight maneuver may include a runway landing. A runway landing, as defined herein, is a landing in which a fixed-wing aircraft, or other aircraft that generates lift by moving a foil forward through air, flies forward toward a flat area of ground or water, alighting on the flat area and then moving forward until momentum is exhausted on wheels or, in the case of landing on water, pontoons; momentum may be exhausted more rapidly by reverse thrust using propulsors, mechanical braking, electric braking, or the like. As a further non-limiting example, a flight maneuver may include a vertical landing protocol. Vertical landing protocol may include, without limitation, a rotor-based landing, such as one performed by rotorcraft such as helicopters or the like. In an embodiment and without limitation, vertical landing protocols may require greater expenditure of energy than runway-based landings. Vertical landing protocol may, for instance and without limitation, require substantial expenditure of energy to maintain a hover or near-hover while descending, while runway-based landings may, as a non-limiting example, require a net decrease in energy to approach or achieve aerodynamic stall. Controller 112 may be designed and configured to operate electronic aircraft via fly-by-wire.

With continued reference to FIG. 1, controller 112 may direct loads, which may include the a load 108, to perform one or more flight maneuvers as described above, including takeoff, landing, and the like. As an example and without limitation, controller 112 may be configured to perform a partially and/or fully automated flight plan. In an embodiment and without limitation, controller 112 may be configured to command the load 108 to increase power consumption, such as to transition to rotor-based flight at aerodynamic stall during a vertical landing procedure or to a runway based controlled descent. In an embodiment and without limitation, controller 112 may determine a moment to send a command to an instrument to measure time, such as a clock, by receiving a signal from one or more sensors, or a combination thereof. As a further example and without limitation, controller 112 may determine, by reference to a clock and/or navigational systems and sensors, that electric aircraft is approaching a destination point, reduce airspeed to approach aerodynamic stall, and may generate a timing-based prediction for the moment of aerodynamic stall to compare to a timer, while also sensing a velocity or other factor consistent with aerodynamic stall before issuing the command. Persons skilled in the art will be aware, upon reviewing the entirety of this disclosure, of various combinations of sensor inputs and programming inputs that controller 112 may use to guide, modify, or initiate flight maneuvers including landing, steering, adjustment of route, and the like.

Still referring to FIG. 1, controller 112 may be communicatively connected to sensor 116. Sensors, as described herein, are any device, module, and/or subsystems, utilizing any hardware, software, and/or any combination thereof to detect events and/or changes in the instant environment and communicate the information to the a controller. Sensor 116 may be mechanically coupled, as described above, to the electric aircraft. Sensor 116 may be configured to detect an electric parameter of the energy source 104. Sensors 116 may be used to monitor the status of the system of both critical and non-critical functions. Sensor 116 may be incorporated into vehicle or aircraft or be remote. As an example and without limitation, sensor 116 may be configured to detect the electrical parameter of the energy source 104. Electrical parameters may include, without limitation, voltage, current, impedance, resistance, temperature. As an example and without limitation, current may be detected by using a sense resistor in series with the circuit and measuring the voltage drop across the resister, or any other suitable instrumentation and/or methods for detection and/or measurement of current As a further example and without limitation, voltage may be detected using any suitable instrumentation or method for measurement of voltage, including methods for estimation as described in further detail below. Each of resistance, current, and voltage may alternatively or additionally be calculated using one or more relations between impedance and/or resistance, voltage, and current, for instantaneous, steady-state, variable, periodic, or other functions of voltage, current, resistance, and/or impedance, including without limitation Ohm's law and various other functions relating impedance, resistance, voltage, and current with regard to capacitance, inductance, and other circuit properties. Alternatively, or additionally, sensor 116 may be wired to an energy source 104 via, for instance, a wired electrical connection. Detecting an electrical parameter may include calculating an electrical parameter based on other sensed electrical parameters, for instance by using Ohm's law to calculate resistance and/or impedance from detected voltage and current levels.

Continuing to refer to FIG. 1, sensor 116 may include, as an example and without limitation, an environmental sensor. As used herein, an environmental sensor may be used to detect ambient temperature, barometric pressure, air velocity, motion sensors which may include gyroscopes, accelerometers, inertial measurement unit (IMU), various magnetic, humidity, and/or oxygen. As another non-limiting example, sensor 116 may include a geospatial sensor. As used herein, a geospatial sensor may include optical/radar/Lidar, GPS and may be used to detect aircraft location, aircraft speed, aircraft altitude and whether the aircraft is on the correct location of the flight plan. a sensor 116 may be located inside the electric aircraft; sensor may be inside a component of the aircraft. In an embodiment, environmental sensor may sense one or more environmental conditions or parameters outside the electric aircraft, inside the electric aircraft, or within or at any component thereof, including without limitation an energy source 104, a propulsor, or the like. The environmental sensor may further collect environmental information from the predetermined landing site, such as ambient temperature, barometric pressure, air velocity, motion sensors which may include gyroscopes, accelerometers, inertial measurement unit (IMU), various magnetic, humidity, and/or oxygen. The information may be collected from outside databases and/or information services, such as Aviation Weather Information Services. Sensor 116 may detect an environmental parameter, a temperature, a barometric pressure, a location parameter, and/or other necessary measurements. Sensor 116 may detect voltage, current, or other electrical connection via a direct method or by calculation. This may be accomplished, for instance, using an analog-to-digital converter, one or more comparators, or any other components usable to detect electrical parameters using an electrical connection that may occur to any person skilled in the art upon reviewing the entirety of this disclosure. Persons skilled in the art, upon reviewing the entirety of this disclosure, will be aware of various ways to monitor the status of the system of both critical and non-critical functions.

With continued reference to FIG. 1, controller 112 may be configured to receive an electrical parameter of the energy source 104 from sensor 116. The electrical parameter of energy source 104 is any electrical parameter, as described above. Controller 112 may be further configured to determine, using the electrical parameter, a power-production capability of the electrical energy source. Power-production capability, as described herein, is a capability to deliver power and/or energy to a load or component powered by an electrical energy source. A power-production capability may include a power delivery capability. As an example and without limitation, power delivery capability may include peak power output capability, average power output capability, a duration of time during which a given power level may be maintained, and/or a time at which a given power level may be delivered, including without limitation a peak and/or average power output capability. The time is provided in terms of a measurement of time in seconds and/or other units from a given moment, a measure of time in seconds and/or other units from a given point in a flight plan, or as a given point in a flight plan, such as, without limitation, a time when power may be provided may be rendered as a time at which an aircraft arrives at a particular stage in a flight plan. As an example and without limitation, power-production capability may indicate whether peak power may be provided at or during a landing stage of flight. Power-production capability may include, as a further example and without limitation, energy delivery capability, such as a total amount of remaining energy deliverable by a given electrical energy source, as well as one or more factors such as time, temperature, or rate that may affect the total amount of energy available. As a non-limiting example, circumstances that increase output impedance and/or resistance of an electrical energy source, and thus help determine in practical terms how much energy may actually be delivered to components, may be a part of energy delivery capability.

Continuing to refer to FIG. 1, controller 112 may be further configured to calculate a projected power-consumption need of the electric aircraft. The projected power-consumption need of electric aircraft is calculated as a function of a flight plan for the electric aircraft. As used herein, a "power-consumption need" includes an energy and/or power need of a component or system, including any component that consumes power, any set of two or more components that consume power, and/or any system that consumes power, such as, without limitation, plurality of propulsors, electric aircraft, and/or components thereof. As an example, and without limitation, power-consumption need may include peak power consumption needs, average power consumption needs, duration of a given power consumption need, such as duration for which peak power consumption and/or average power consumption is needed, a time, as described above in reference to power-production capability at which a given power level will be needed, and the like. As a further example and without limitation, power-consumption need may include a need to consume peak power, during a landing stage of a flight plan, for a sufficient duration of time to accomplish a landing maneuver, such as without limitation a hovering landing as described in further detail below. As another non-limiting example, power-consumption need may include an energy consumption need, such as a total amount of energy needed to perform an entire flight plan, one or more stages of a flight plan, or one or more flight maneuvers. Energy consumption need may include as a non-limiting example, energy needed to power essential flight components such as propulsors, non-essential components such as certain lights or other electrical apparatuses in electric aircraft, and any buffer or reserve energy amount required, such as a reserve energy amount required for emergent situations.

With continuing reference to FIG. 1, controller 112 may further include determining whether the power-production capability is sufficient for the projected power-consumption need. In an embodiment, controller 112 may create a first number representing power-production capability of an electrical source 104 and a second number representing a projected power-consumption need of electrically powered aircraft 304 and compare the two numbers; controller 112 may maintain a buffer number by which power-production capability must exceed a projected power-consumption need. Controller 112 may determine that power-production capability is sufficient for projected power-consumption need if the two numbers are equal; controller 112 may determine that power-production capability is sufficient for a projected power-consumption need if power-production capability exceeds a projected power-consumption need by buffer number. Controller 112 may perform this calculation using lookup tables or mathematical relations as described herein. As an example and without limitation, controller 112 may retrieve from a lookup table a potential level necessary to drive a propulsor at a given velocity. Continuing the non-limiting example, the controller 112 may perform a calculation based on the demands described above which determines a rate of power consumption based on the demand by the propulsors at a given time in flight. This power consumption rate may, without limitation, be used to determine if the power demand of propulsors needed to arrive at the originally selected location using the originally selected landing method is possible given the current energy source capacity. Persons skilled in the art, upon reviewing the entirety of this disclosure, will be aware of various alternative means for determining a potential demand of a propulsor as described herein. Still referring to FIG. 1, IFOA system 100 further may include graphical user interface (GUI) 120. Graphical user interface 120 may be communicatively coupled to the energy source 104 and the controller 112. As described herein, a graphical user interface is a form of user interface that allows users to interact with the controller through graphical icons and/or visual indicators. The user may, without limitation, interact with graphical user interface 120 through direct manipulation of the graphical elements. Graphical user interface 120 may be configured to display at least an element of the power-production capability of the energy source 104, as described in detail above. As an example and without limitation, graphical user interface 120 may be displayed on any electronic device, as described herein, such as, without limitation, a computer, tablet, remote device, and/or any other visual display device.

Still referring to FIG. 1, IFOA system 100 is configured to generate, as a function of the comparison of the power production capability and the projected power consumption need, a power production command datum. For the purposes of this disclosure, a "power production command datum" is one or more elements of data configured to command one or more components of the herein described system to alter their operation. In nonlimiting examples, altering a components operation may include initiating, shutting down, reversing, increasing, decreasing, modulating, fluctuating, or otherwise changing a components power output. The power production command datum may be configured to alter energy source 104. Power production command datum may increase, decrease, modulate, fluctuate, activate, deactivate, change a path of at least an electrical characteristic associated with energy source 104. Power production command datum may include one or more electrical signals transmitted and received by at least two electrical components. The electrical components may be any as described herein capable of transmitting, receiving, altering, conditioning, or otherwise communicating using electrical signals such as any flight component, any portion of any controller, computing device, chip, located locally or remotely, or another nondisclosed electrical component. Power production command datum may, in a nonlimiting example, automatedly lower power consumption from energy source 104 in response to projected power-consumption need, power-production capability, or another detected datum or data. Power production command datum may, in a nonlimiting example, automatedly increase power consumption from energy source 104 in response to the comparison. Power production command datum may be configured to alter one or more electrical parameters associated with energy source 104. For example, and without limitation power production command datum may alter energy source 104 future energy output such as limit energy flow out of energy source for a certain amount of time, until a threshold amount of energy is flowed, energy storage limits, voltage, current, or resistance of any portion of energy source 104, among others. Power production command datum may be communicated to any of the components as described herein by any controller, flight controller, or computing device as described herein.

Still referring to FIG. 1, power production command datum may include an interaction with any user as described herein. Power production command datum may include an approval by the user, denial by the user, accepting an automated suggestion by the user, displaying the power production command datum to the user, such as with a GUI as described herein. Power production command datum may be communicated to one or more users remotely located or onboard the aircraft. Power production command datum may be voted on by one or more users, one or more computing devices or portions thereof, a combination thereof, or one or more other parties granted voting privileges by one or more of the systems described herein, in a nonlimiting embodiment. Power production command datum may be suggested to the user visually, audially, haptically, a combination thereof, or another form of notification to a user. Power production command datum may be interacted with visually, audially, haptically, or otherwise to indicate accepting, denying, or adjusting to the suggested power production command datum. In non-limiting embodiments, power production command datum may be configured to command any one or more flight elements, chipset components, flight components, energy sources, propulsors, loads, sensors, GUIs, controllers, flight controllers, sub-controllers, co-controllers, autonomous functions, semi-autonomous functions or modes, and/or non-autonomous functions or modes as described herein. Power production command datum may be configured to alter the function of any of the above-described systems as described herein.

Figure 2:
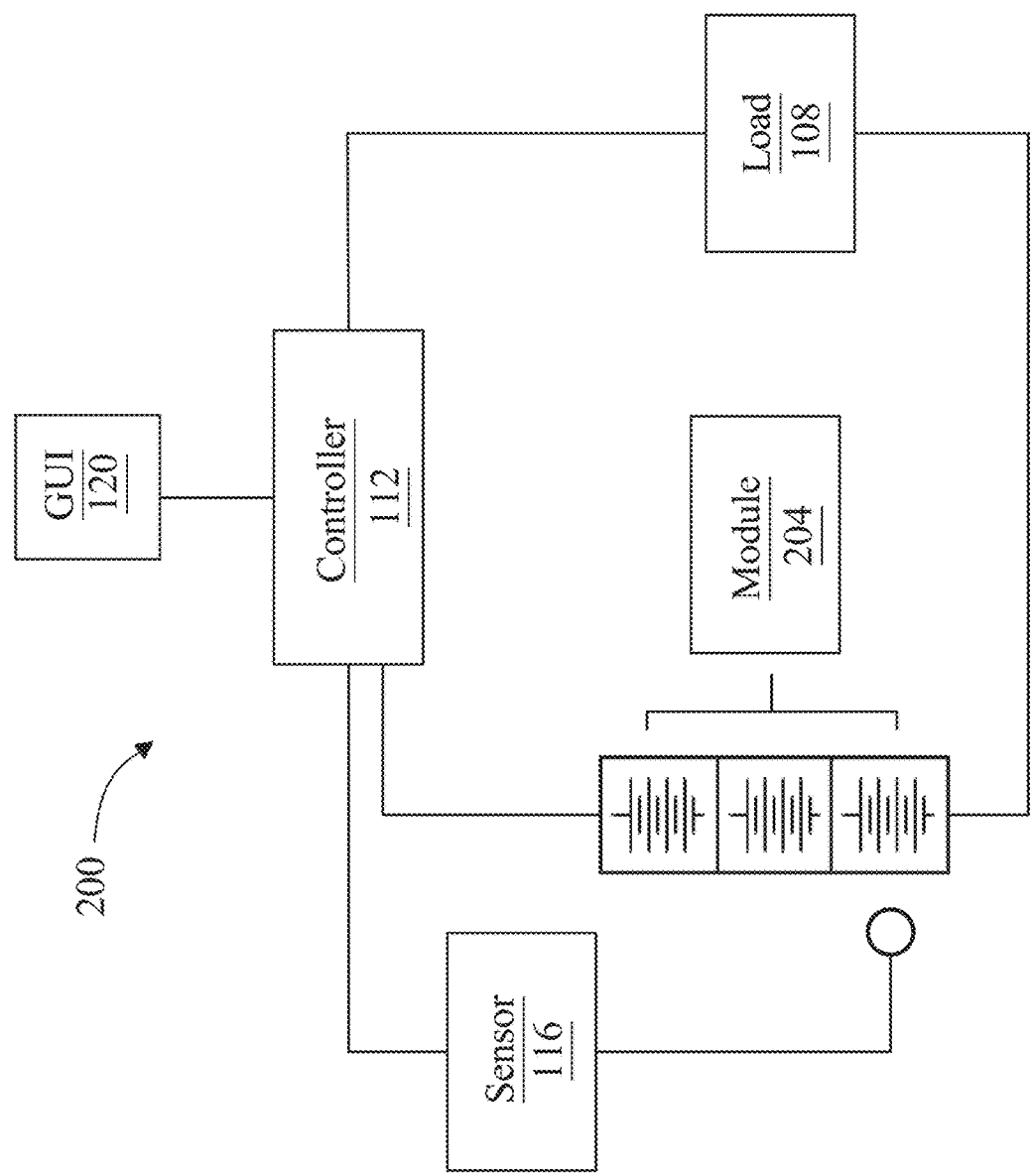
FIG. 2 is a circuit diagrams depicting an exemplary embodiment of an energy source.

Referring now to FIG. 2, an energy source 200 may include a cell, such as a battery cell, or a plurality of battery cells making a battery module 204. The energy source 200 may include a plurality of energy sources. Module 204 may include batteries connected in parallel or in series or a plurality of modules connected either in series or in parallel designed to deliver both the power and energy requirements of the application and/or a phase of the operation. Connecting batteries in series may increase the voltage of an energy source 200 which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of the energy source 200 may be based on the individual battery cell performance or an extrapolation based on the measurement of an electrical parameter. In an embodiment where the energy source 200 includes a plurality of battery cells, the overall power output capacity may be dependent on the electrical parameters of each individual cell. If one cell experiences high self-discharge during demand, power drawn from the energy source 200 may be decreased to avoid damage to the weakest cell. The at least an energy source 200 may further include, without limitation, wiring, conduit, housing, cooling system and battery management system. Persons skilled in the art will be aware, after reviewing the entirety of this disclosure, of many different components of an energy source.

Still referring to FIG. 2, an energy source 200 may supply power to a plurality of critical functions in the aircraft. Critical functions in the aircraft may include, without limitation, communications, lighting, navigation, de-icing, steering cruising, landing and descents, carried out by a load 108. High peak loads may be necessary to perform certain landing protocols which may include, but are not limited to, hovering descent or runway descents. During landing, propulsors may demand a higher power than cruising as required to descend in a controlled manner. When an energy source 200 is at high state of charge, it may be capable of supporting a peak load and continued in-flight cruising functions. High peak loads may be necessary to perform certain landing protocols which may include, but are not limited to, hovering descent or runway descents. As an example and without limitation, during landing, propulsors may demand a higher power than cruising as required to descend in a controlled manner. As the energy source 200 approaches a low state of charge, resulting from supporting operations in flight, energy source may not be capable of supporting the peak loads of any mission critical function. The at least an energy source 200 may, without limitation, become substantively discharged during any in-flight function due to in-flight power consumption and unforeseen power and current draws that may occur during flight. As a non-limiting example, the power and current draws may be from environmental conditions, components of the energy source or other factors which impact the energy source state of charge (SOC). SOC, as used herein, is a measure of remaining capacity as a function of time and is described in more detail below. SOC and/or maximum power the energy source 200 can deliver may decrease during flight as the voltage decreases during discharge. SOC and/or power output capacity of an energy source may be associated with an ability of energy source to deliver energy as needed for a task such as driving a propulsor for a phase of flight such as landing, hovering, or the like. As a non-limiting example, other factors, including state of voltage, and/or estimates of state of voltage or other electrical parameters of an energy source, may be used to estimate current state of an energy source 200 and/or future ability to deliver power and/or energy, as described in further detail below. Energy source 200 may be able to support landing according to a given landing protocol during a partial state of charge (PSOC) but this ability may depend on demands required for the landing protocol. Vehicle or aircraft landing power needs may exceed measured power consumption at any particular time in flight.

With continued reference to FIG. 2, in an embodiment, one energy source 200 may provide power to a plurality of propulsors. As an example and without limitation, the energy source 200 may provide power to all propulsors in an aircraft. Additionally and alternatively, a plurality of the energy source 200 may each provide power to two or more propulsors, such as, without limitation, a "fore" energy source 200 providing power to propulsors located toward the front of an aircraft, while an "aft" energy source provides power to propulsors located toward the rear of the aircraft. Persons skilled in the art, upon reviewing the entirety of this disclosure, will be aware of various combinations of energy sources 200 that may each provide power to single or multiple propulsors in various configurations.

Still referring to FIG. 2, in an embodiment, a single propulsor or group of propulsors may be powered by a plurality of the energy source 200. As an example and without limitation, two or more energy sources may power one or more propulsors. Two energy sources may include, without limitation, a first energy source having high specific energy density and a second energy source having high specific power density. As a non-limiting example, the two energy sources may be selectively deployed as required for higher-power and lower-power needs. Additionally and alternatively, a plurality of the energy source 200 may be placed in parallel to provide power to the load 108. For example and without limitation, a plurality of the energy source 200 may be placed in parallel to provide power to the same single propulsor or plurality of propulsors. Persons skilled in the art, upon reviewing the entirety of this disclosure, will be aware of various combinations of the energy source 200 that may be used to drive the load 108.

Figure 3A:
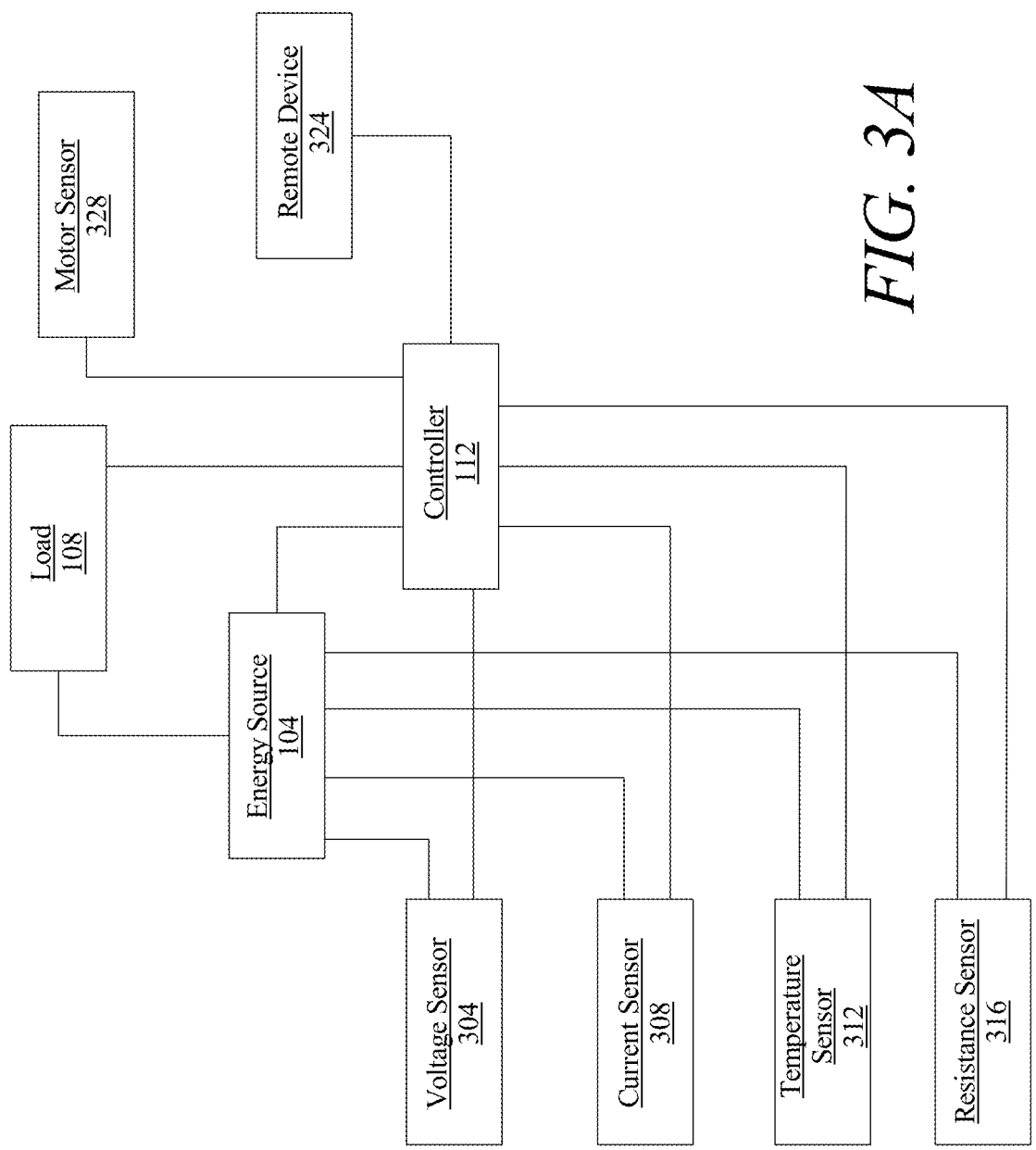
FIGS. 3A-B are schematic diagrams depicting an exemplary embodiment of an energy source and sensors and an aircraft.
Figure 3B:
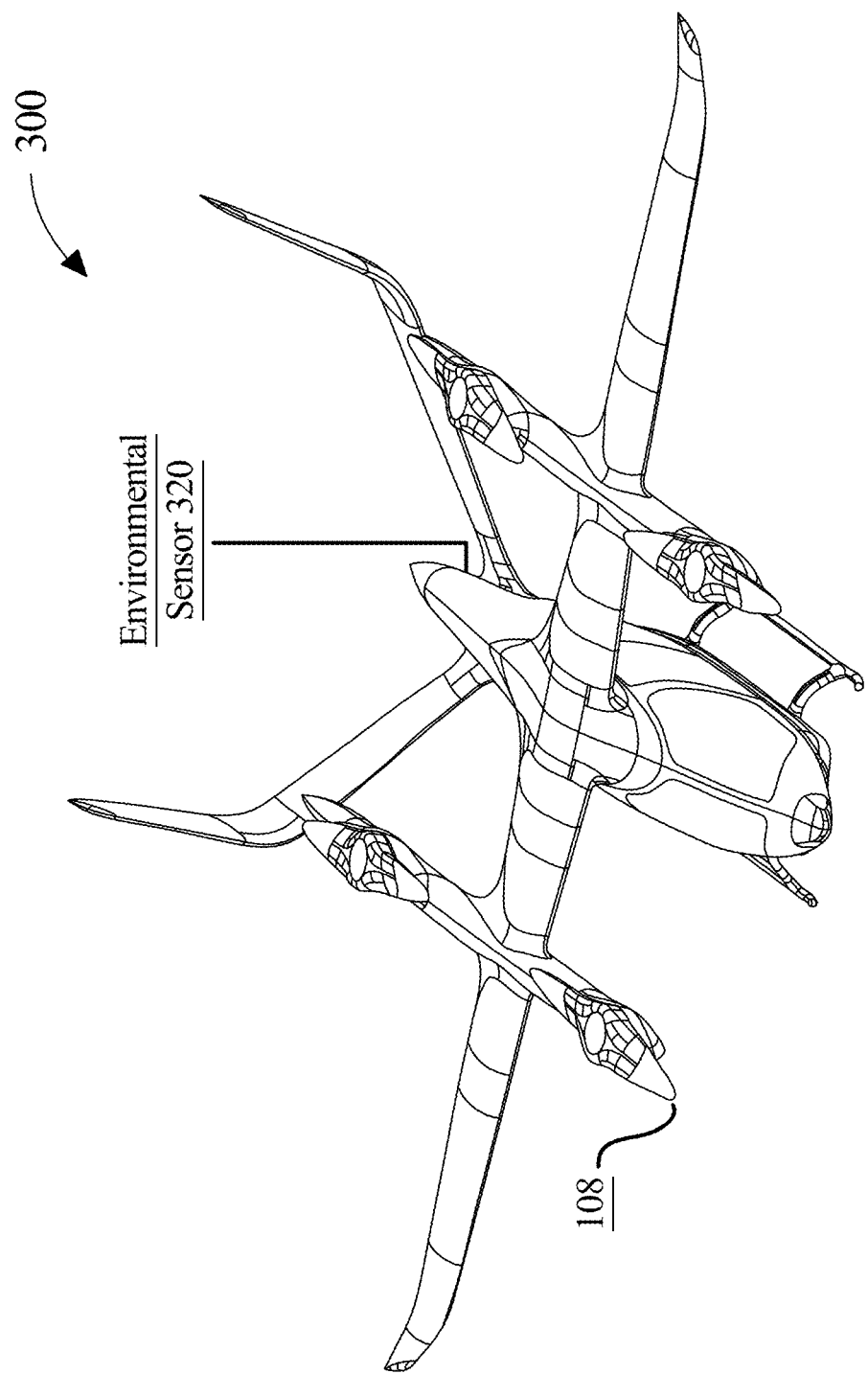

Referring now to FIG. 3A and FIG. 3B, IFOA system 100 may be incorporated in an electric aircraft 300. Electric aircraft 300 may be an electric vertical takeoff and landing (eVTOL) aircraft. An electric aircraft may be an aircraft powered by an energy source 104. Electric aircraft 300 may include one or more wings or foils for fixed-wing or airplane-style flight and/or one or more rotors for rotor-based flight. Electric aircraft 300 may include a controller 112 communicatively and/or operatively mechanically coupled to each wing, foil, and/or each rotor, as described herein. Electric aircraft 300 may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Still referring to FIGS. 3A and 3B, a number of aerodynamic forces may act upon the electric aircraft 300 during flight. Forces acting on an electric aircraft 300 during flight may include, without limitation, thrust, the forward force produced by the rotating element of the electric aircraft 300 and acts parallel to the longitudinal axis. Another force acting upon electric aircraft 300 may be, without limitation, drag, which may be defined as a rearward retarding force which is caused by disruption of airflow by any protruding surface of the electric aircraft 300 such as, without limitation, the wing, rotor, and fuselage. Drag may oppose thrust and acts rearward parallel to the relative wind. A further force acting upon electric aircraft 300 may include, without limitation, weight, which may include a combined load of the electric aircraft 300 itself, crew, baggage, and/or fuel. Weight may pull electric aircraft 300 downward due to the force of gravity. An additional force acting on electric aircraft 300 may include, without limitation, lift, which may act to oppose the downward force of weight and may be produced by the dynamic effect of air acting on the airfoil and/or downward thrust from the load 108. Lift generated by the airfoil may depend on speed of airflow, density of air, total area of an airfoil and/or segment thereof, and/or an angle of attack between air and the airfoil.

With continued reference to FIG. 3A and FIG. 3B, sensor 116 may be configured to detect an electrical parameter of an energy source 104 and may be communicatively connected, as defined above, to controller 112. Sensor 116 may be used to detect a plurality of electrical parameters. In an embodiment, the first electrical parameter may include, without limitation, voltage, current, resistance, or any other parameter of an electrical system or circuit. The second electrical parameter may be a function of the first electrical parameter. A third electrical parameter may be calculated from the first and second electrical parameters as a delta or function. For example, the current may be calculated from the voltage measurement. The resistance may be calculated from using the voltage and current measurements.

Continuing to refer to FIGS. 3A and 3B, a plurality of sensors may be incorporated in IFOA system 100 and/or electric aircraft 300. Sensors of plurality of sensors may be designed to detect a plurality of electrical parameters or environmental data in-flight, for instance as described above. Plurality of sensors may, as a non-limiting example, include a voltage sensor 304, wherein voltage sensor 304 is designed and configured to detect the voltage of the energy source 104. As a further-non-limiting example, the plurality of sensors may include a current sensor 308, wherein current sensor 308 is designed and configured to detect the current of the energy source 104. As a further non-limiting example, the plurality of sensors may include a temperature sensor 312, wherein temperature sensor 312 is designed and configured to detect the temperature of an energy source 104. As a further non-limiting example, a plurality of sensors may include a resistance sensor 316, wherein resistance sensor 316 is designed and configured to detect the resistance of an energy source 104. As another non-limiting example, a plurality of sensors may include an environmental sensor 320, wherein environmental sensor 320 may be designed and configured to detect a plurality of environmental data including, without limitation, ambient air temperature, barometric pressure, turbulence, and the like. Environmental sensor 320 may be designed and configured, without limitation, to detect geospatial data to determine the location and altitude of the electronically powered aircraft by any location method including, without limitation, GPS, optical, satellite, lidar, radar. Environmental sensor 320, as an example and without limitation, may be designed and configured to detect at a least a parameter of the motor. Environmental sensor 320 may be designed and configured, without limitation, to detect at a least a parameter of the propulsor. As a further non-limiting example, a plurality of sensors may include a motor sensor 328. Sensor datum collected in flight, by sensors as described herein, may be transmitted to the controller 112 or to a remote device 324, which may be any device as described herein and may be used to calculate the power output capacity of an energy source 104 and/or projected energy needs of electric aircraft during flight, as described in further detail below.

Figure 4:
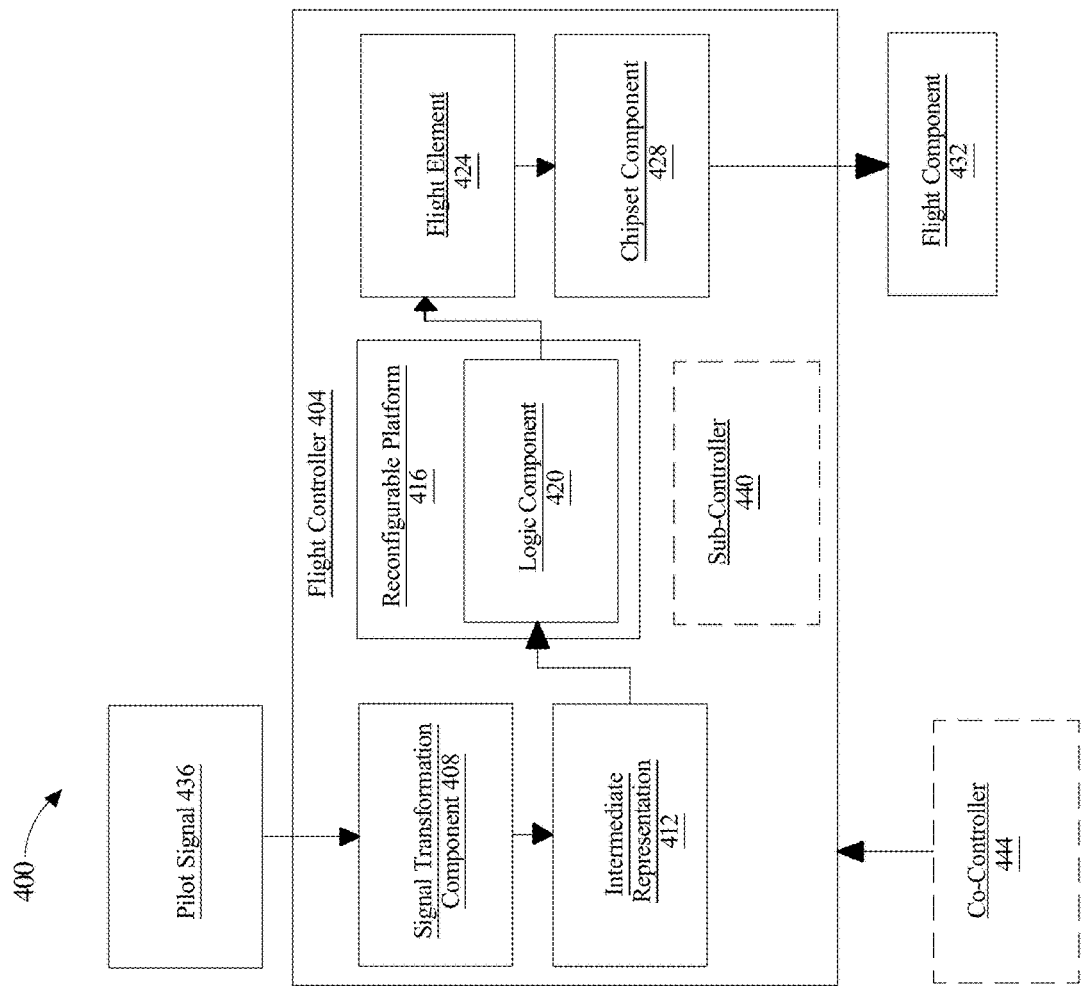
FIG. 4 is a block diagram of an exemplary embodiment of a flight controller.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may be similar to or the same as flight controller 112 as described herein. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 432 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs xi that may receive numerical values from inputs to a neural network containing the node and/or from other nodes. Node may perform a weighted sum of inputs using weights $w_1$ that are multiplied by respective inputs xi. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_1$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_1$ may be determined by training a neural network using training data, which may be performed using any suitable process as described above. In an embodiment, and without limitation, a neural network may receive semantic units as inputs and output vectors representing such semantic units according to weights $w_1$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further nonlimiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
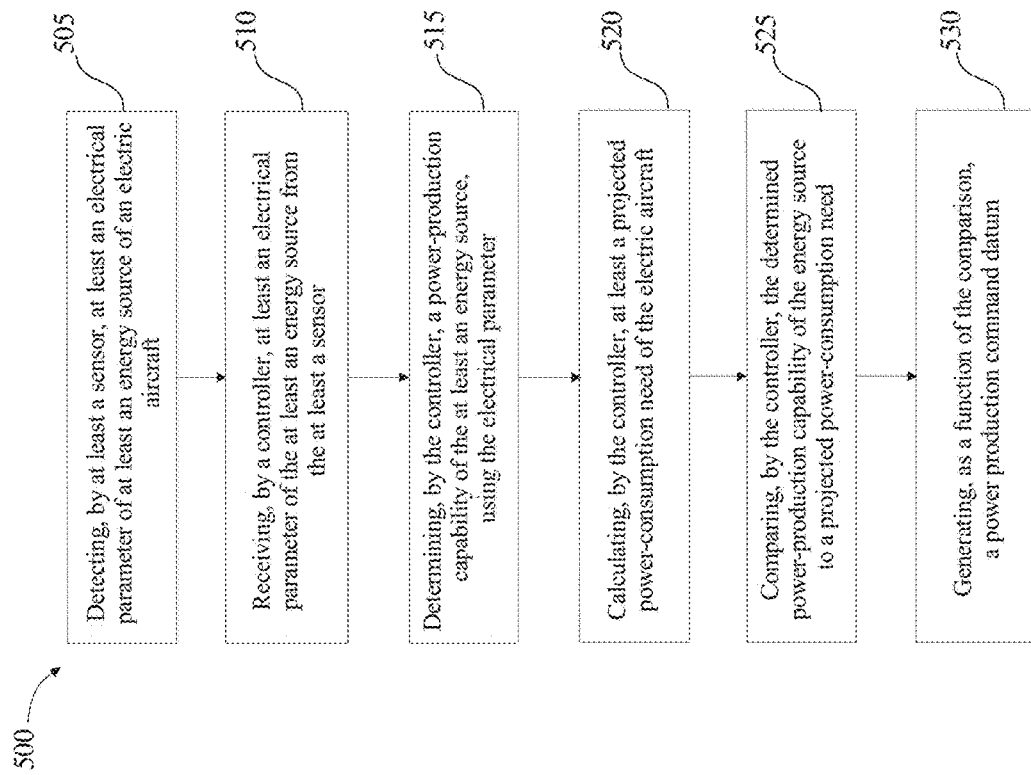
FIG. 5 is a flow chart illustrating the method of operational in-flight assessment.

Referring now to FIG. 5, an embodiment of a method 500 of in-flight operational assessment is illustrated. At step 505, sensor 116 detects an electrical parameter of an energy source 104 of an electric aircraft. A least an electrical parameter may include any electrical parameter as described above, including without limitation a voltage, current, resistance, temperature or environmental parameter. The electrical parameter may be detected, for instance, using any means or method as described above, including using a sensor 116 and/or via an electrical or other connection between controller 112 and an energy source 104.

Continuing to refer to FIG. 5, in an embodiment, detecting an electrical parameter may include measuring a voltage. Voltage of a battery cell, a plurality of battery cells, modules or plurality of modules may be detected. Voltage under plurality of loads 108 may be alternatively or additionally detected or sensed. Detecting an electrical parameter may include, without limitation, measuring a current; a current of a battery cell, a plurality of battery cells, modules or plurality of modules may be detected. Detecting an electrical parameter may further include, as a non-limiting example, inferring or calculating an electrical parameter based on sensed electrical parameters, for instance by using Ohm's law or other relations as described and/or discussed above to calculate resistance and/or impedance from detected voltage and current levels. The electrical parameter may include signal properties such as frequency, wavelength, or amplitude of one or more components of a voltage or current signal. Persons skilled in the art, upon reviewing the entirety of this disclosure, will be aware of various electrical parameters, and techniques for detecting such parameters, consistent with this disclosure.

Still referring to FIG. 5, an electrical parameter may be a current. The sensor 116 may detect current directly or calculate the current given other electrical parameters which include voltage and resistance. Current of, any component, without limitation, in energy source 104, such as a cell, battery cells, plurality of battery cells may be detected. Current flow through wires, a plurality of wires, or other electrical components by which current is carried may be detected. Current flowing between two components of IFOA system 100 may be detected; the two components may be connected via current carrying wire. In an embodiment, such as where IFOA system 100 is in an electric aircraft, wire gauge may be reduced in order to save on weight, which may be critical to the design of the aircraft, as a non-limiting example. When the wire gauge is reduced, the potential for overload of current in the wire with current may rise. Any current flow that is in excess of the current carrying capability of the wire may cause heat, and rapid heat may be caused when a direct short is created.

Still viewing FIG. 5, detecting the electrical parameter may include detecting a change in the electrical parameter. In an embodiment and without limitation, the change in voltage as a function of time may be detected. A change in current as a function of time may be detected. This may be accomplished, for example and without limitation, by repeatedly measuring or sampling data detected by a sensor 116 or by controller 112 and using the repeated samples or measurement to calculate changes or rates of change; alternatively or additionally, a curve, graph, or continuum of detected values may be matched to mathematical functions using, for instance, linear approximation, splining, Fourier series calculations, or the like. In an embodiment, detecting a change in an electrical parameter may include detecting a change in a first electrical parameter of the electrical parameter, detecting a change in a second electrical parameter of the electrical parameter, and calculating a dependency of the second electrical parameter on the first electrical parameter. In an embodiment, calculating the change in voltage as a function of time may be used; for instance, voltage may be sampled repeatedly or continuously over a time period, and the rate of change over time may be observed. In another case, detecting the current as a function of voltage may be used; for instance, instantaneous or average voltage may be divided by current according to Ohm's law to determine resistance, while instantaneous or average impedance may similarly be calculated using formulas relating voltage, current, or other parameters to impedance. Detection of an electrical parameter may be performed via digital sampling; an electrical parameter that is directly detected may be sampled, for instance, at a rate expressed in frequency of sample per second, such as, without limitation, a 10 Hz sample rate, or a 1 kHz sample rate. Directly detected or sampled electrical parameter may be subjected to one or more signal processing actions, including scaling, low-pass filtering, high-pass filtering, band-pass filtering, band-stop filtering, noise filtering, or the like.

Still referring to FIG. 5, detecting change in first electrical parameter may include inducing the change in the first electrical parameter. For instance, and without limitation, first electrical parameter may include output current of an energy source. Controller 112 may induce an increased output current by increasing an energy demand of one or more components or elements mechanically coupled to an energy source 104 and observe output voltage of an energy source 104 that results from the modified current. Similarly, controller may increase or decrease resistance seen by an energy source 104, for instance by switching one or more resisters in parallel or in series with load 108, by modifying a resistance level of a transistor, such as a power FET controlling supply to a load 108, or the like; output voltage, output current, or other electrical parameters' changes may then be detected.

In an embodiment, and still referring to FIG. 5, inducing change in first electrical parameter may further include modifying electrical power being supplied to a propulsor of the electronic aircraft from an energy source of the energy source. In an embodiment and without limitation, the controller 112 may reduce power to a propulsor from an energy source 104 to reduce speed or altitude. Alternatively or additionally, controller 112 may increase, without limitation, power to a propulsor from an energy source, 104 increasing speed or altitude. In an embodiment and without limitation, when power to propulsor is increased or decreased relatively briefly, or to a limited extent, there may be a negligible change in speed or altitude as a result of the change. Alternatively or additionally, increases or decreases in power to a propulsor may be balanced by counteracting increases or decreases in power. As a non-limiting example, controller 112 may apply more torque, causing provision of more power to one propulsor of multiple propulsors while applying less torque, and thus providing less power, to another propulsor, such that net increased or decreased power from all propulsors is unchanged; this may be done alternately between sides so a course of electric aircraft 304 is unaltered. Alternatively or additionally, two or more energy sources of an energy source 104 may be mechanically coupled to a motor that has dual (or multiple) windings, each winding going to a different separate energy source. Power to one set of windings may be increased while power to other windings is deceased, such that one source of the energy source 104 has a net increase or decrease in power output while a change in propulsive power from the propulsor is negligible or nonexistent. Multiple energy sources of an energy source 104 may have power increased or decreased, permitting measurement of resulting changes in an electrical parameter for each of multiple energy sources.

With continued reference to FIG. 5, in an embodiment induced change in first parameter may have one or more signal properties. For instance, and without limitation, induced change may be an impulse function or the like. Alternatively, induced change may be a pulse function representing a step from a first value to a second value followed at some interval to a step back to the first value. Interval may be, as an example and without limitation a period of second, milliseconds, or the like. In an embodiment, parameter values detected for a pulse response may reflect steady-state values more accurately than parameter values detected for an impulse response or vice-versa. For instance, and without limitation, an output impedance of an energy source 104 detected in response to an impulse may differ from an output impedance of the energy source 104 as detected in response to a pulse; as an example, capacitance and/or inductance may cause higher impedances in response to impulse signals and/or high-frequency signals than in response to steadier pulse function signals, the latter of which may have more characteristics in common with power demands of a flight maneuver such as a landing sequence. Although the above description has involved observation of an electrical parameter based on changes to other electrical parameters, in an embodiment, a change in an electrical parameter resulting from a change to another parameter may also be observed. For instance, and without limitation, a change in temperature may induce a change in voltage or current as a function of resistance within an energy source 104. This may also be observed and used as part of a calculation as set forth in further detail below.

With continued reference to FIG. 5, at step 510, controller 112 receives an electrical parameter of the energy source 104 from the sensor 116. The electrical parameter of the energy source 104 is any electrical parameter as described above in reference to FIGS. 1-3. At step 515. Controller 112 determines a power-production capability of the energy source 104. The power-production capability is determines using the electrical parameter. As used herein, a power-production capability is a capability to deliver power and/or energy to a load or component powered by an electrical energy source. A power-production capability may include any power delivery capability as described above in reference to FIGS. 1-3.

With continued reference to FIG. 5, determination of power-production capability may be performed by any suitable method, including without limitation using one or more models of the energy source to predict one or more circuit parameters of electric power output; one or more circuit parameters of electric power output may include power, current, voltage, resistance or any other detect of a parameter of an electric circuit. One or more models may include, without limitation, a lookup or reference table providing the one or more circuit parameters based on conditions of an energy source and/or of a circuit containing the energy source; conditions may include, without limitation, a state of charge of the energy source, a temperature of the energy source, a resistance of a load mechanically coupled to the energy source, a current, voltage, or power demand of a circuit or load mechanically coupled to the energy source, or the like. One or more models may include one or more equations, reference, graphs, or maps relating the one or more circuit parameters to one or more conditions as described above. One or more models may be created using data from a data sheet or other data provided by a manufacturer, data received from one or more sensors during operation of in-flight operational assessment IFOA system 100, simulation generated using a simulation program that models circuit behaviors, analysis of analogous circuits, any combination thereof, or any other predictive and/or sensor-based methods for determining relationships between one or more circuit parameters and one or more conditions. The power capacity of an energy source 104 may decline after each flight cycle, producing a new set of data or reference tables to calculate parameters.

Continuing to refer to FIG. 5, in an embodiment, state of voltage (SOV) may be used instead of or in addition to state of charge to determine a current state and power-production capability of an energy source 104. State of voltage may be determined based on open-circuit voltage. Open circuit voltage may, as a non-limiting example, be estimated using voltage across terminals, for instance by subtracting a product of current and resistance, as detected and/or calculated using detected or sampled values, to determine open-circuit voltage. As a non-limiting example, instantaneous current and voltage may be sampled and/or detected to determine Delta V and Delta I, representing instantaneous changes to voltage and current, which may be used in turn to estimate instantaneous resistance. Low-pass filtering may be used, as a non-limiting example, to determine instantaneous resistance more closely resembling a steady-state output resistance of an energy source 104 than from transient effects, either for discharge or recharge resistance. Open-circuit voltage may, in turn be used to estimate depth of discharge (DOD) and/or SOC, for instance by reference to a data sheet graph or other mapping relating open circuit voltage to DOD and/or SOC. Remaining charge in an energy source 104 may alternatively or additionally be estimated by one or more other methods including without limitation current integrator estimate of charge remaining.

Figure 6:
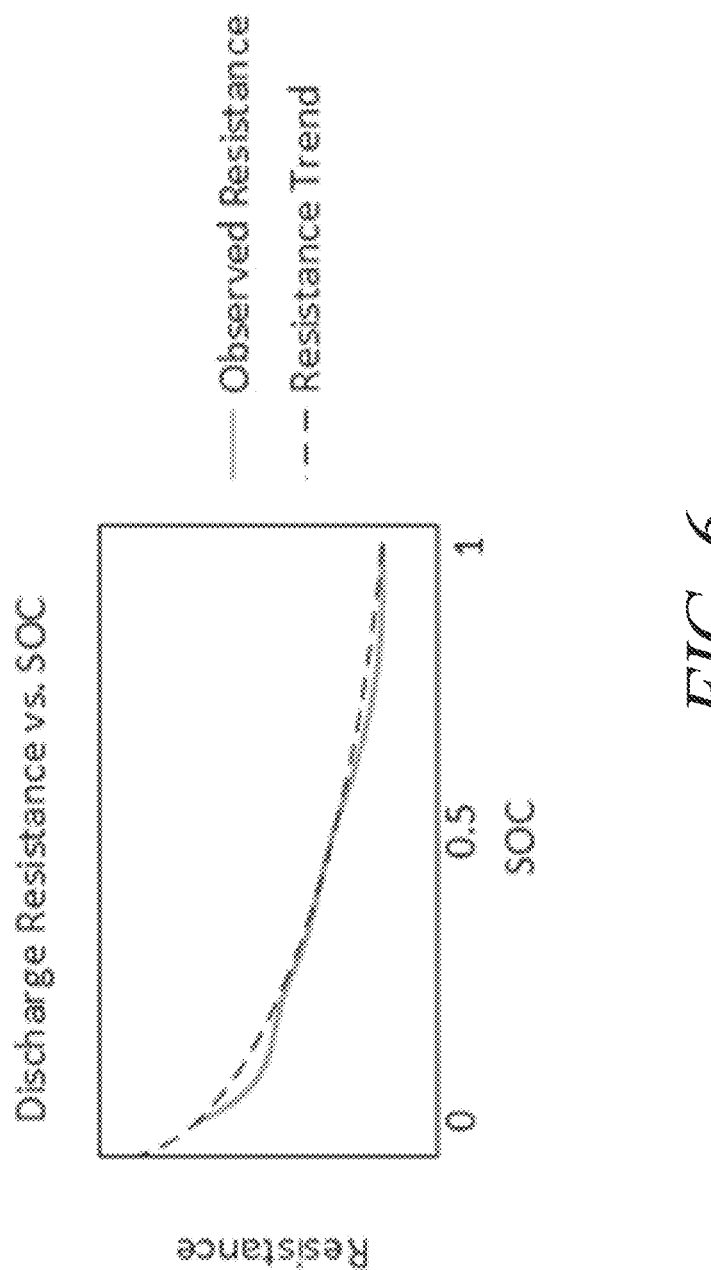
FIG. 6 is a graph illustrating an exemplary embodiment of open circuit voltage and derivative with respect to state of charge of open circuit voltage, plotted against state of charge.

Still referring to FIG. 5, SOV and/or open circuit voltage of an energy source 104 and/or one or more cells or components thereof may be used to determine power-production capability in an embodiment. Discharging a battery to the minimum allowed cell potential may give maximum discharge power. This may be a function of a cell's open circuit potential and series resistance, as determined for instance using the following equation:

$$Pcell \cdot \max\ discharge = (Voc - Vcell \cdot \min) * \frac{Vcell.\min}{Cell.resistance.discharge}$$

where Voc is open circuit voltage, Vcell. min is the minimum allowed open circuit potential, and cell. resistance. discharge is a cell's discharge resistance, which may be calculated in an embodiment as described above. One or more additional calculations may be used to aid in determination of likely future behavior of an electrical energy source. For instance, a derivative of open circuit voltage with respect to SOC may be calculated and/or plotted; FIG. 6 is a graph illustrating open circuit voltage and the derivative of open circuit voltage with respect to SOC, as plotted against SOC. Alternatively or additionally, a derivative of resistance with respect to SOC may be tracked.

In an embodiment, and still referring to FIG. 5, determining power-production capability may further include determining a state of charge (SOC) of an energy source 104. Determining the power-production capability may include comparing an electrical parameter to a curve representing a projected evolution over time of an energy source 104. In an embodiment and without limitation, SOC vs time may be used to determine the power and energy outputs of the energy source and may represent the available battery capacity. In an embodiment and without limitation, an energy source 104 consists of a plurality of battery cells. SOC may be impacted by the chemistry type and footprint which can affect the charge and discharge rates and the operational range over time. SOC may also be impacted by any component of the system including wiring, conduit, housing or any other hardware which may cause resistance during use. Cycle life of an energy source 104 will also be affected by the number of charge and discharge cycles completed in operation. Capability of an energy source 104 to store energy may decrease after several iterations of the charge/discharge cycle over its lifetime.

Still referring to FIG. 5, determination of power-production capability may further include modifying a curve as a function of the electrical parameter; for instance, determining may include modifying an SOC curve as a function of the electrical parameter. As an energy source 104 is being used, the available capacity output may be reduced which can be detected as a change in voltage over time. Projected data curves for the power output delivery based on the calculations may be recalculated. As described above, the SOC of an energy source 104 may degrade after each flight and charge and discharge cycle. The new curves generated will be used to determine future power output delivery capabilities. Any or all steps of the method may be repeated in any order. For example, the SOC of an energy source 104 may be calculated more than one time during a flight in order to accurately ensure an energy source 104 has the power output capacity for the landing method and location, as described in further detail below. In an embodiment, controller 112 may compare one or more sampled values of an electrical parameter to curve; where values tend to be more than a threshold amount off of the projected curve, controller 112 may replace that curve with another one representing, for instance, an SOC curve for an energy source 104 that is more aged, and thus has a higher output resistance, for an energy source 104 having a higher temperature resulting in a higher output resistance, or the like.

Referring again to FIG. 5, an energy source 104 may include a plurality of energy sources connected in series. For instance, energy source 104 may include a set of batteries and/or cells connected in series to achieve a particular voltage, or the like. Determining power-production capability of an energy source 104 may include determining a plurality of component energy capabilities representing the energy capabilities of each energy source of the plurality of energy sources, identifying a lowest component energy capability of the plurality of component energy capabilities, and determining the delivery capability of the energy source as a function of the lowest component energy capability. For instance, and without limitation, one cell or battery connected in series with another cell or battery may have a lower SOC, or otherwise be able to produce less total energy and/or power than the other battery or cell; as a result, an energy source 104 overall may be limited primarily by the cell or battery with lower SOC, making the effective power-production capability overall dependent on the power-production capability of the cell or battery with the lowest SOC.

Still referring to FIG. 5, in an embodiment, an SOC of an energy source 104 can be calculated with datum obtained from sensor 116, or a plurality of sensors during flight. Datum may be received at remote device 354 or may be calculated using estimation methods used to estimate the SOC. Datum may include, without limitation, voltage, current, resistance, impedance, and/or temperature of an energy source 104. These estimations may include, without limitation, coulomb counting, open circuit voltage, impedance, or other models. Estimations may also use lookup tables or equivalent data structures which may be obtained from technical specifications, such as datasheets, describing the energy source behavior under, without limitation, load and environmental conditions. Alternatively or additionally, one or more mathematical relations may be used to determine current SOC while in flight. Persons skilled in the art will be aware, upon reviewing the entirety of this disclosure, will be aware of various combinations of methods used to determine SOC.

With continued reference to FIG. 5, at step 520, controller 112 calculates a projected power-consumption need of the electric aircraft. A projected power-consumption need may be calculated as a function of a flight plan for the electric aircraft. As used herein, a "power-consumption need" includes an energy and/or power need of a component or system, including any component that consumes power, any set of two or more components that consume power, and/or any system that consumes power, including without limitation plurality of propulsors, electric aircraft, and/or components thereof. Power-consumption need may include any power-consumption need as described above in reference to FIGS. 1-3.

In an embodiment and continuing to refer to FIG. 5, calculating a projected power-consumption need may include determining a projected power-consumption need of a remaining portion of the flight plan. A projected power-consumption need for performing a given flight plan may be stored in memory accessible to controller 112. Flight plan may include, without limitation, the geospatial location of the landing site, the calculated distance to the landing site, the time required to reach the landing site, the landing methods. As an example and without limitation, controller 112 may store in its memory projected power-consumption needed to perform a scheduled landing according to a landing protocol called for in flight plan, a likely energy cost of traveling a particular distance while cruising, and the like. Stored energy costs may include one or more dependencies on conditions of flight. For example and without limitation, energy needed to travel a certain distance through the air may depend on speed and direction of wind, air density, degree of turbulence, exterior temperature, or the like. In an embodiment, calculating further includes determining a current state of electric aircraft 300 with respect to flight plan. Determination of current state may include identifying a current location of electronic aircraft 304. Current location of electric aircraft 300 may be determined using elapsed time of flight, geographical position as calculated by GPS or similar systems, information about current position as received from other parties such as air traffic controllers, and/or optical, radar, or Lidar data identifying landmarks or other geographic features outside electronic aircraft. Calculation may include identifying a remaining portion of flight plan as a function of current state.

Still referring to FIG. 5, calculation of a projected power-consumption need may be performed using data from an environmental sensor 320. In an embodiment, calculating the projected power-consumption need further includes receiving a sensor datum from an environmental sensor. Calculating the projected power-consumption need may further include calculating the projected power-consumption need as a function of a sensor datum. Receiving a sensor datum may include, as a non-limiting example, receiving an external temperature. Projected power-consumption needs may, for example and without limitation, increase at high external temperatures owing to less efficient performance of components at high temperatures generally. Similarly, a high external temperature may cause controller 112 to predict that one or more components' temperatures are likely to increase during the flight, causing the one or more components to use energy less efficiently, and increasing the energy needed to perform steps of flight plan. The sensor datum may include, for example and without limitation, a temperature of a component of the electronic aircraft; as noted above, one or more components may perform less efficiently at higher temperatures, or at lower temperatures. Sensor datum may include a degree of turbulence, which may be detected using, for instance, motion data collected using an IMU or the like. A higher degree of turbulence may be used, as a non-limiting example, by controller 112 to predict greater energy consumption needs. Persons skilled in the art, upon reviewing the entirety of this disclosure, will be aware of various external sensor data that may be used to predict a projected power-consumption need as used herein.

Continuing to refer to FIG. 5, at step 525, controller 112 may determine whether power-production capability is sufficient for a projected power-consumption need. In an embodiment, controller 112 may create a first number representing power-production capability of an electrical source 104 and a second number representing a projected power-consumption need of electrically powered aircraft 304 and compare the two numbers; controller 112 may maintain a buffer number by which power-production capability must exceed a projected power-consumption need. Controller 112 may, for example and without limitation, determine that power-production capability is sufficient for projected power-consumption need if the two numbers are equal. As a further example and without limitation, controller 112 may determine that power-production capability is sufficient for a projected power-consumption need if power-production capability exceeds a projected power-consumption need by buffer number. As another non-limiting example, controller 112 may perform this calculation using lookup tables or mathematical relations as described above. For instance and without limitation, controller 112 may retrieve from a lookup table a potential level necessary to drive a propulsor at a given velocity. The controller 112 may, without limitation, perform a calculation based on the demands described above which determines a rate of power consumption based on the demand by the propulsors at a given time in flight. This power consumption rate may be used to determine if the power demand of propulsors needed to arrive at the originally selected location using the originally selected landing method is possible given the current energy source capacity. Persons skilled in the art, upon reviewing the entirety of this disclosure, will be aware of various alternative means for determining a potential demand of a propulsor as described herein.

Still referring to FIG. 5, controller 112 may determine that the power-production capability is not sufficient for the projected power-consumption needs and modifying the flight plan as a function of the power-production capability. In an embodiment, if the calculated energy need for the first flight plan is not sufficient, controller 112 may analyze a number of options for a second flight plan which will optimize the remaining energy capacity of an energy source 104. Second flight plan may include a different location based on distance but maintain the original landing protocol. For instance and without limitation, flight plan may include a first landing protocol, and modifying the flight plan further comprises replacing the first landing protocol with a second landing protocol. For example and without limitation, the first landing protocol may be a hovering landing, the second landing protocol is an airplane landing and/or runway-based landing. The landing protocol may include, as a non-limiting example, a vertical landing sequence which further comprises an aerodynamic stall of a wing-based flight followed by a rotor-based flight landing. The landing protocol may include, as a further non-limiting example, a runway approach landing sequence similar to a fixed wing landing protocol. In an electric aircraft, an energy source 104 must have enough capacity to power the aircraft and satisfy the load demand of the plurality of propulsors to execute a safe and accurate landing. In a non-limiting example, if the projected power-consumption need of the first flight plan exceeds the remaining capacity of the energy source at a given time during flight, a second landing protocol may be chosen by the controller 112. As an example and without limitation, analysis and computation may alternately or additionally be performed by a remote device 354 and transmitted to controller 112. Second flight plan may include, without limitation, a different landing protocol at the same location as the first flight plan. Second flight plan may further include, without limitation, both a different landing protocol and landing location. Second flight plan may involve, as an example and without limitation, using the same landing protocol at a different landing location.

Still referring to FIG. 5, at step 530, the controller 112, which may be any controller including any flight controller as described herein, such as flight controller 404, generates, as a function of the comparison of power production capability of the energy source and the projected power-consumption need, a power production command datum. At least an element of the power-production capability includes any power-production capability as described above in reference to FIGS. 1-4. The element of the power-production capability may include, for example and without limitation, the remaining time able to use rotor-based flight based on the energy source 104.

Referring now to FIG. 6, a graph illustrating open circuit voltage and the discharge resistance with respect to SOC, as plotted against SOC is illustrated. Energy source 104 capable of delivering may, without limitation, be calculated using a SOC vs time curve. Calculation may include, as a non-limiting example, plotting points on SOC vs. time curve to determine a point along the curve an energy source 104, a component cell, and/or other portion thereof has arrived. Determining a point along the curve may enable controller 112 to predict future potential power output by reference to remainder of curve. For a particular energy source, the design may dictate safe operation SOC conditions as indicated in figures below. As an example and without limitation, a safety reserve, such as a gas tank reserve, may also be designated based on the design characteristics and manufacturing data; such as operating range may by enforced by the controller 112, energy source 104 may only operate in the designated operating range, and a safety reserve may only be used in cases where a critical functions demand power in order to ensure a safe flight.

Figure 7A:
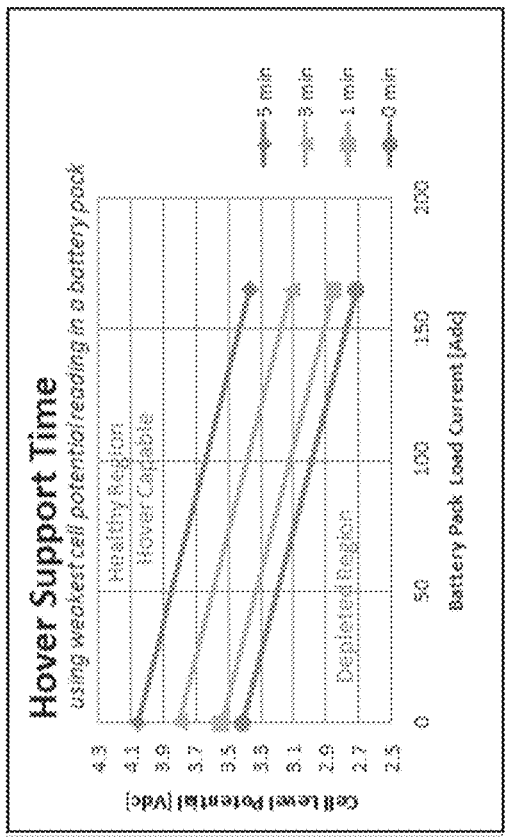
FIGS. 7A-B are graphs illustrating exemplary embodiments of hover time plotted as a function of current versus terminal voltage.
Figure 7B:
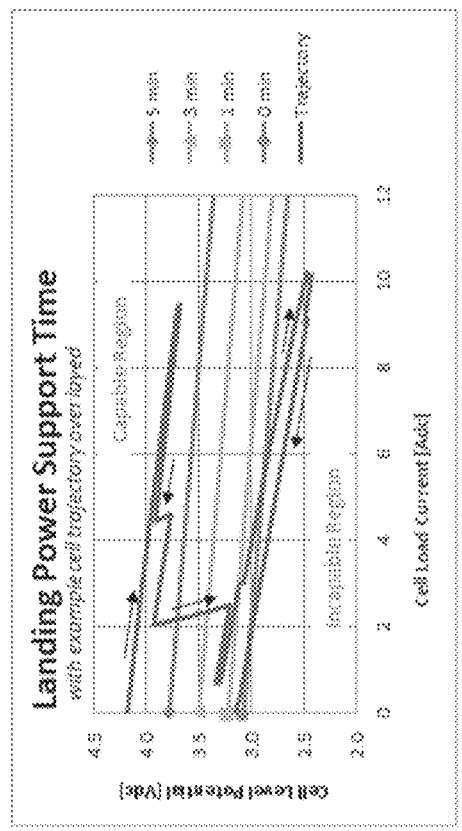

Referring now to FIGS. 7A and 7B, power-production capability may be calculated or provided with respect to one or more flight maneuvers. As a non-limiting example, power-production capability may be expressed in terms of hover support time. Hover support time, as described herein, is defined as a period of time for which an energy source is capable of outputting sufficient power to permit electric aircraft to hover. FIG. 7A illustrates how hover support time may be mapped against observed terminal potential and current for a plurality of detected potentials. As an example and without limitation, a potential ranging from 4.1 V to 3.4 V over a current range of 0 to 160 Amps, may correspond to a hover support time of 5 minutes, while a voltage range over the same current range of 3.8 to 3.1 V may correspond to an over time of 3 minutes. Actual behavior of a battery and/or cell may be compared to or plotted over a gradient as represented in FIG. 7A. For instance, shown in FIG. 7B actual behavior of a battery and/or cell may be compared to or plotted over a gradient, where the battery is not able to support the final landing event, as shown by the trajectory line displaying lower than the 0 min line in the incapable region, in this non-limiting example. The trajectory line, as displayed, is a plot of cell voltage versus load current during a flight. The arrows incorporated in FIG. 7B show how the battery behavior is revealed during the flight from inception to the failed attempt at landing. Alternatively or additionally, ability to land and/or perform another flight maneuver may similarly be estimated.

Figure 8:
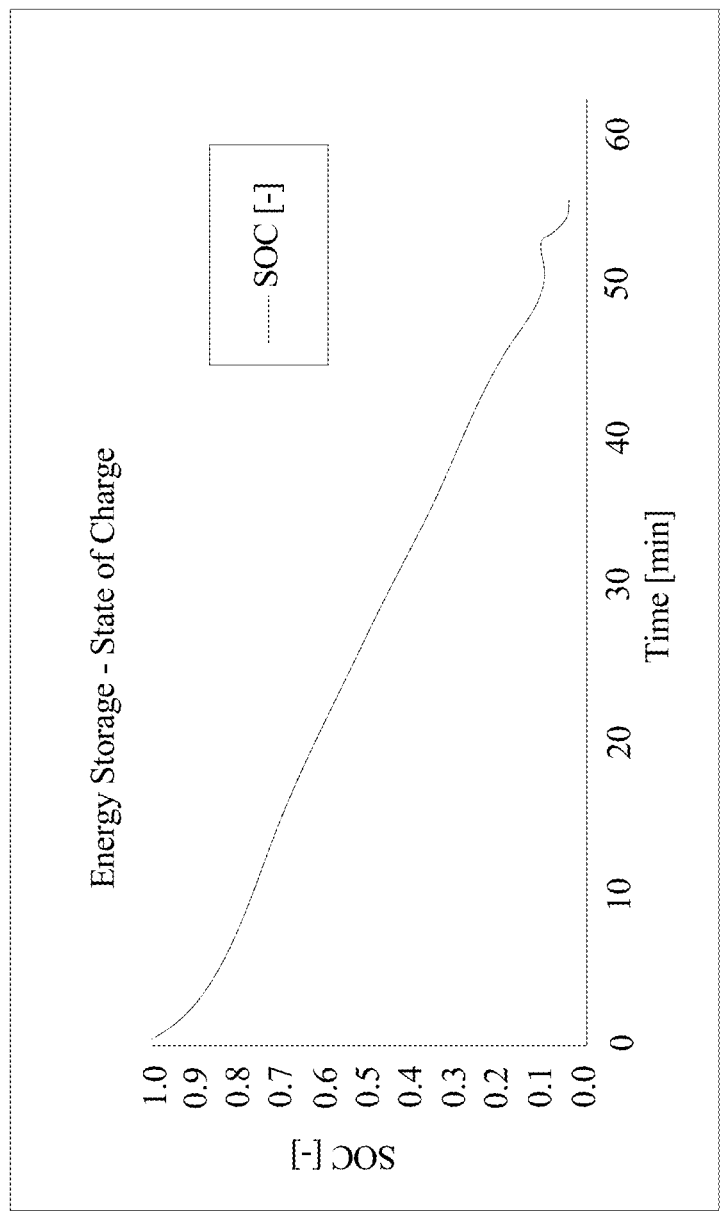
FIG. 8 is a graph showing the state of charge of an energy source as a function of time.

Referring now to FIG. 8, a graph illustrates an SOC of an embodiment of an energy source as a function of time. In an embodiment, determining power-production capability may further include determining a state of charge (SOC) of an energy source 104. Determining the power-production capability may include, without limitation, comparing an electrical parameter to a curve representing a projected evolution over time of an energy source 104. In an embodiment, information plotting SOC against time may be used to determine power and energy outputs of the energy source and may represent available battery capacity. In an embodiment, an energy source 104 may consist of a plurality of battery cells. SOC may be impacted by the chemistry type and footprint which can affect the charge and discharge rates and the operational range over time. As an example and without limitation, SOC may also be impacted by any component of IFOA system 100 or an aircraft containing IFOA system 100, such as wiring, conduit, housing or any other hardware which may cause resistance during use. Cycle life of an energy source 104 will also be affected by the number of charge and discharge cycles completed in operation. As an example and without limitation, capability of an energy source 104 to store energy may decrease after several iterations of a charge/discharge cycle over its lifetime and the graph in FIGS. 7A-B may change over time. As a further example and without limitation, capacity of an energy source 104, when including a plurality of cells connected in series in a module, may decrease due to differences in discharge rates of individual cells in the series connection. For example, discharge rates may be related to or caused by variables such as, without limitation, temperature, initial tolerances, material impurities, porosity, electrolyte density, surface contamination, and/or age. A low-capacity battery cell may discharge more rapidly than other cells in a module. As a non-limiting example, a damaged battery may have lower capacity and will become discharged more rapidly than a healthy battery.

Still referring to FIG. 8, calculation of power-production capability may further include modifying a curve as a function of the electrical parameter. As an example and without limitation, determining may include modifying an SOC curve as a function of the electrical parameter. As a further example, the energy source 104, is being used the available capacity output may be reduced. The available capacity output may be, without limitation, detected as a change in voltage over time. In an embodiment, projected data curves for the power output delivery based on the calculations may be recalculated. As described above, the SOC of the energy source 104 may degrade after each flight and/or change and discharge cycle. The new curves generated will be used to determine future power output delivery capabilities. Any or all steps of the method may be repeated in any order. For example and without limitation, the SOC of an energy source 104 may be calculated more than one time during a flight in order to accurately ensure the energy source 104 has the power output capacity for the chosen landing method and location, as described in further detail above. In an embodiment and without limitation, controller 112 may compare one or more sampled values of an electrical parameter to curve, wherein values tend to be more than a threshold amount off of the projected curve. For example and without limitation, controller 112 may replace that curve with another one, such as replacing the curve with one representing an SOC curve for the energy source 104 that is more aged, and thus has a higher output resistance, for an energy source having a higher temperature resulting in a higher output resistance, or the like.

Figure 9:
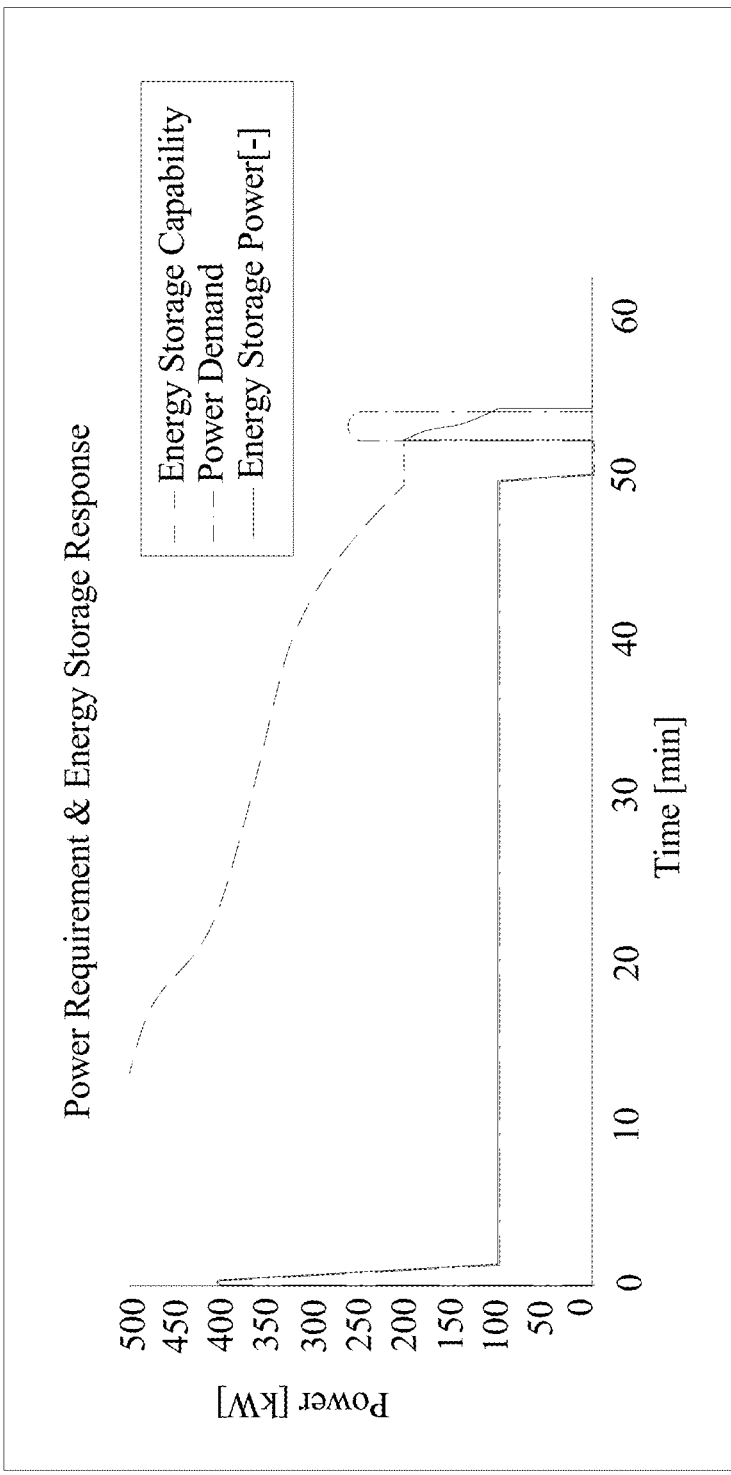
FIG. 9 is a graph showing the power demand of load as a function of time in an exemplary embodiment wherein landing of an electric aircraft is delayed, leaving insufficient power for an intended high power vertical landing.

Referring now to FIG. 9, a graph illustrates the power of the energy source 104 as a function of time. For instance, the graph illustrates a condition where landing of an electric aircraft is delayed. As a result of the delayed landing of an electric aircraft, an energy source 104 is unable to support a power demand for an intended or planned landing. The energy storage capability is a lower power value than the power demanding, which does not allow the electric aircraft to land in the intended format, such as rotor-based flight.

Figure 10:
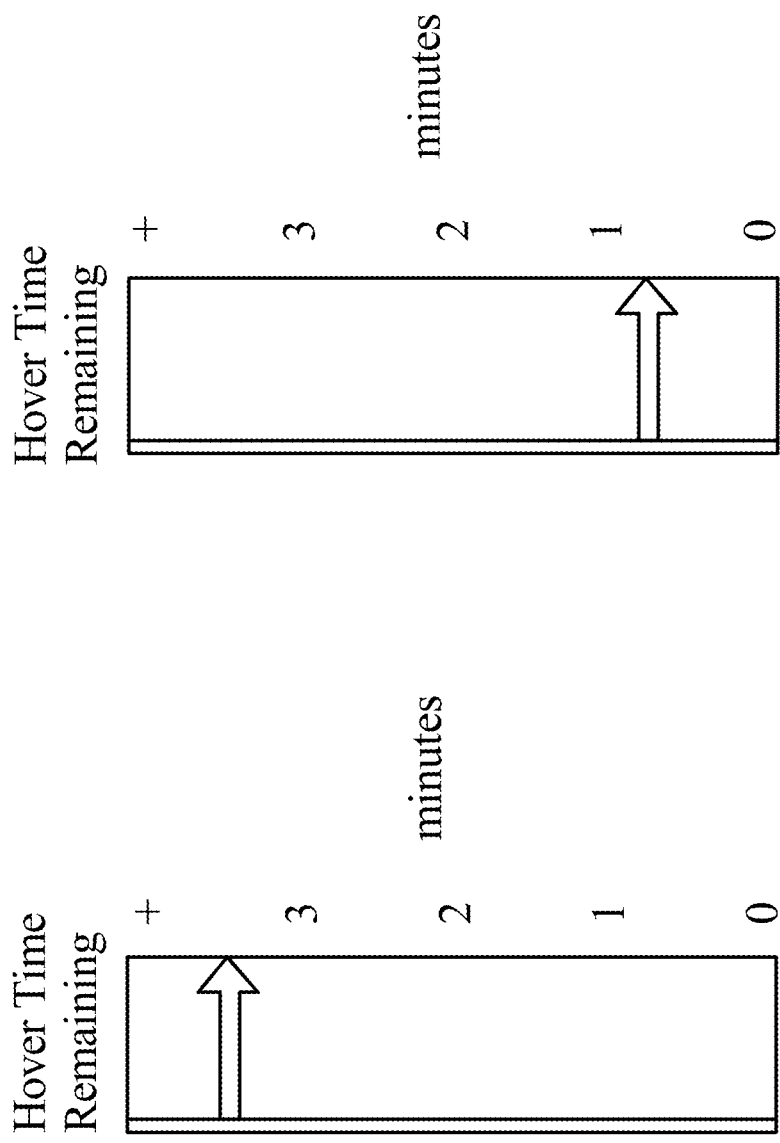
FIG. 10A-B is an exemplary embodiment of a display of an element of the power-production capability by a graphical user interface.

Referring now to FIGS. 10A-10B, an embodiment of the element of the power-production capability of the energy source 104 displayed by a graphical user interface 120. At least an element of the power production capability may include any element of the power-production capability. As used herein, a power-production capability is a capability to deliver power and/or energy to a load or component powered by an electrical energy source. A power-production capability may include any power delivery capability as described above in reference to FIGS. 1-12. As an example and without limitation, FIG. 10A illustrates an element of the power production capability of the energy source 104 displayed by a graphical user interface 120. The power-production capability may be, without limitation, the time remaining in rotor-based flight, such as hover time remaining. Hover time remaining may be, without limitation, displayed in minutes. FIG. 10A illustrates a display by a graphic user interface of an electric aircraft with a hover time remaining of about three and a half minutes. As a further example and without limitation, FIG. 10B additionally and alternatively illustrates an element of the power production capability of the energy source 104 displayed by a graphical user interface 120. The power-production capability may be, without limitation, the time remaining in rotor-based flight, such as hover time remaining. FIG. 10B illustrates a display by a graphic user interface of an electric aircraft with a hover time remaining of about forty-five seconds.

In an embodiment, sensor feedback using any sensor as described above may replace or supplement calculation of potential and/or power consumption requirements. For instance, controller 112 may record sensor feedback indicating angular velocity of and/or torque exerted by a motor in one or more instances, along with corresponding electrical parameters of the circuit driving motor such as voltage, current, power consumed, or the like, and storing values so derived; controller 112 may look up such stored values to determine potential and/or power consumption at a given desired angular speed or torque for a propulsor. Controller 112 may perform interpolation or regression to predict likely potential and/or power consumption at an angular speed and/or torque not specifically recorded. Persons skilled in the art, upon reviewing the entirety of this disclosure, will be aware of various ways in which sensor feedback and calculation may be combined consistently with this disclosure to determine potential and/or power consumption needs of a propulsor and/or plurality of propulsors.

In an embodiment, the above-described elements may alleviate problems resulting from systems wherein the in-flight measurement of power output capacity may not meet the demand for power to land the electric aircraft. An in-flight operational assessment and optimization of the remaining in-flight power output capacity will ensure a safe landing mode. The landing mode for electric aircraft has been a challenge for the industry as it tries to optimize the battery for range (not for landing). There are other battery technologies which are capable of very high pulses power for landing, but they store very little energy. Above-described embodiments enable the combination of two power sources in a lightweight and robust configuration compatible with safe and high-performance flight.

Figure 11:
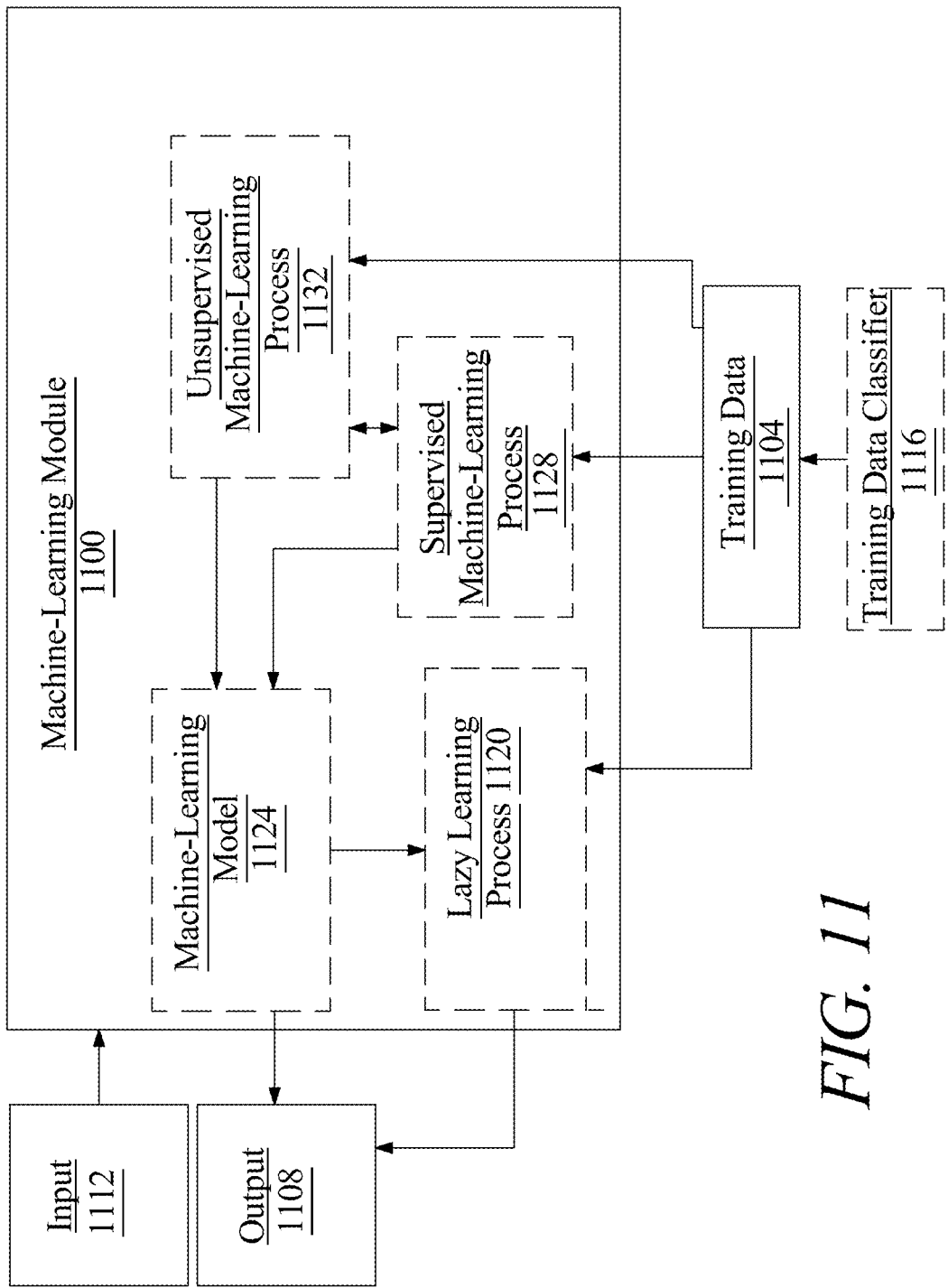
FIG. 11 is a block diagram of an exemplary embodiment of a machine learning module.

Referring now to FIG. 11, an exemplary embodiment of a machine-learning module 1100 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1104 to generate an algorithm that will be performed by a computing device/module to produce outputs 1108 given data provided as inputs 1112; this is in contrast to a non-machine learning software program where the commands to be executed are determined in advance by a user and written in a programming language.

Still referring to FIG. 11, "training data," as used herein, is data containing correlations that a machine-learning process may use to model relationships between two or more categories of data elements. For instance, and without limitation, training data 1104 may include a plurality of data entries, each entry representing a set of data elements that were recorded, received, and/or generated together; data elements may be correlated by shared existence in a given data entry, by proximity in a given data entry, or the like. Multiple data entries in training data 1104 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1104 according to various correlations; correlations may indicate causative and/or predictive links between categories of data elements, which may be modeled as relationships such as mathematical relationships by machine-learning processes as described in further detail below. Training data 1104 may be formatted and/or organized by categories of data elements, for instance by associating data elements with one or more descriptors corresponding to categories of data elements. As a non-limiting example, training data 1104 may include data entered in standardized forms by persons or processes, such that entry of a given data element in a given field in a form may be mapped to one or more descriptors of categories. Elements in training data 1104 may be linked to descriptors of categories by tags, tokens, or other data elements; for instance, and without limitation, training data 1104 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 11, training data 1104 may include one or more elements that are not categorized; that is, training data 1104 may not be formatted or contain descriptors for some elements of data. Machine-learning algorithms and/or other processes may sort training data 1104 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1104 to be made applicable for two or more distinct machine-learning algorithms as described in further detail below. Training data 1104 used by machine-learning module 1100 may correlate any input data as described in this disclosure to any output data as described in this disclosure. As a non-limiting illustrative example flight elements and/or pilot signals may be inputs, wherein an output may be an autonomous function.

Further referring to FIG. 11, training data may be filtered, sorted, and/or selected using one or more supervised and/or unsupervised machine-learning processes and/or models as described in further detail below; such models may include without limitation a training data classifier 1116. Training data classifier 1116 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1100 may generate a classifier using a classification algorithm, defined as a processes whereby a computing device and/or any module and/or component operating thereon derives a classifier from training data 1104. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 11, machine-learning module 1100 may be configured to perform a lazy-learning process 1120 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1104. Heuristic may include selecting some number of highest-ranking associations and/or training data 1104 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 11, machine-learning processes as described in this disclosure may be used to generate machine-learning models 1124. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1124 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1124 may be generated by creating an artificial neural network, such as a convolutional neural network comprising an input layer of nodes, one or more intermediate layers, and an output layer of nodes. Connections between nodes may be created via the process of "training" the network, in which elements from a training data 1104 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 11, machine-learning algorithms may include at least a supervised machine-learning process 1128. At least a supervised machine-learning process 1128, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1104. Persons skilled in the art, upon reviewing the entirety of this disclosure, will be aware of various possible variations of at least a supervised machine-learning process 1128 that may be used to determine relation between inputs and outputs. Supervised machine-learning processes may include classification algorithms as defined above.

Further referring to FIG. 11, machine learning processes may include at least an unsupervised machine-learning processes 1132. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 11, machine-learning module 1100 may be designed and configured to create a machine-learning model 1124 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 11, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e. g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e. g., a computing device) and that causes the machine to perform any one of the methodologies and/or embodiments described herein. Examples of a machine-readable storage medium include, but are not limited to, a magnetic disk, an optical disc (e. g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e. g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e. g., a computing device) and any related information (e. g., data structures and data) that causes the machine to perform any one of the methodologies and/or embodiments described herein.

Examples of a computing device include, but are not limited to, an electronic book reading device, a computer workstation, a terminal computer, a server computer, a handheld device (e. g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
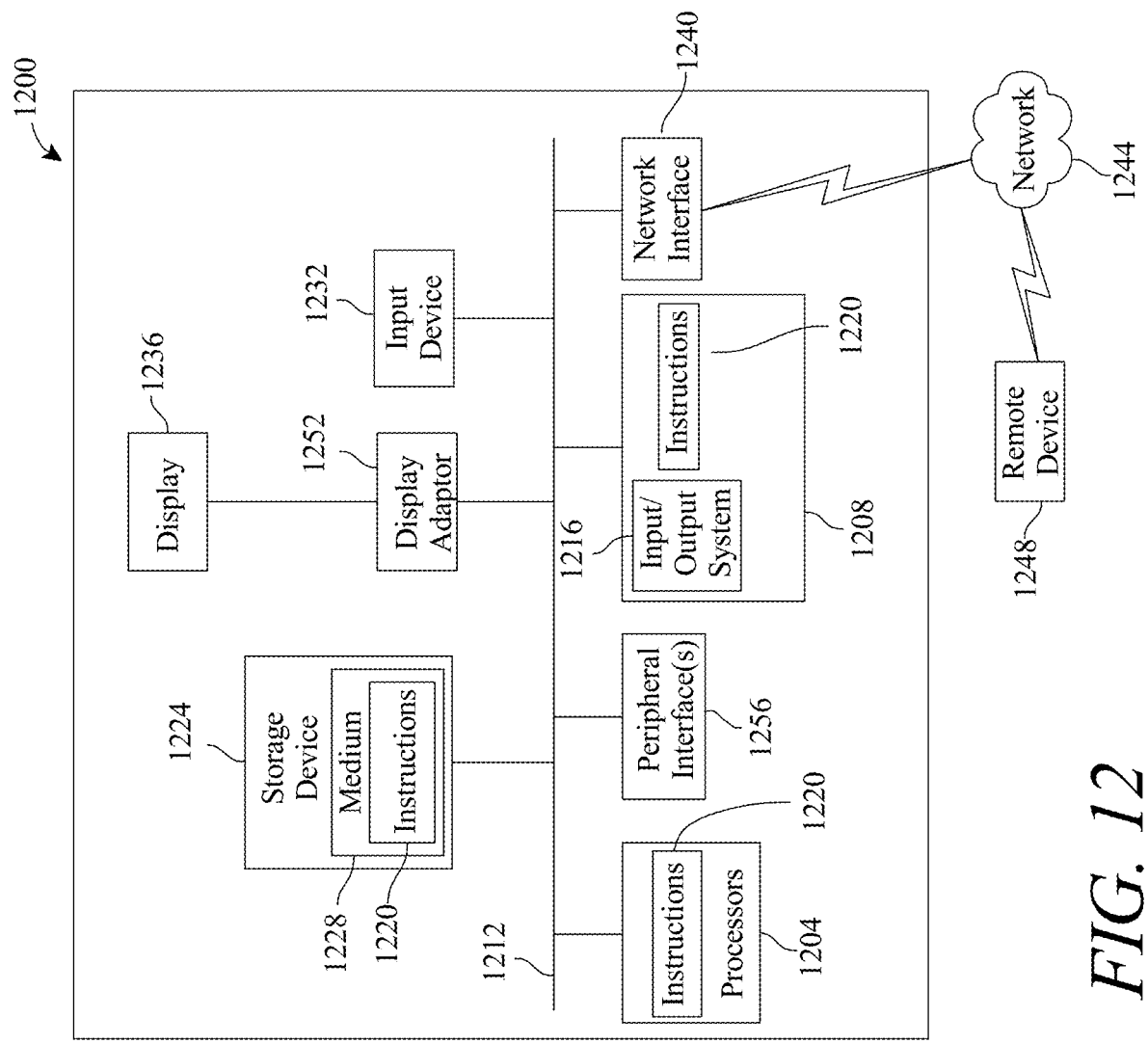
FIG. 12 is a block diagram of a computing system that can be used to implement any one or more of the methodologies disclosed herein and any one or more portions thereof.

FIG. 12 shows a diagrammatic representation of one embodiment of a computing device in the form of a computer system 1200 within which a set of instructions for causing a control system, such as the vehicle system of FIG. 12, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Memory 1208 may include various components (e. g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e. g., stored on one or more machine-readable media) instructions (e. g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e. g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1294 (FIREWIRE), and any combinations thereof. In one example, storage device 1224 (or one or more components thereof) may be removably interfaced with computer system 1200 (e. g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e. g., a keyboard), a pointing device, a joystick, a gamepad, an audio input device (e. g., a microphone, a voice response system, etc.), a cursor control device (e. g., a mouse), a touchpad, an optical scanner, a video capture device (e. g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e. g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e. g., a mobile network interface card, a LAN card), a modem, and any combination thereof. Examples of a network include, but are not limited to, a wide area network (e. g., the Internet, an enterprise network), a local area network (e. g., a network associated with an office, a building, a campus or other relatively small geographic space), a telephone network, a data network associated with a telephone/voice provider (e. g., a mobile communications provider data and/or voice network), a direct connection between two computing devices, and any combinations thereof. A network, such as network 1244, may employ a wired and/or a wireless mode of communication. In general, any network topology may be used. Information (e. g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for in-flight operational assessment, the system comprising:
    an energy source mechanically coupled to an electric aircraft, wherein the energy source is configured to power at least a portion of the electric aircraft;
    a load mechanically coupled to the energy source, wherein the load comprises an aileron and a propulsor;
    a sensor mechanically coupled to the electric aircraft, wherein the sensor is configured to detect an electrical parameter of the energy source; and
    a controller operating in a semi-autonomous mode and communicatively connected to the sensor and the load, wherein the controller is designed and configured to:
    receive the electrical parameter of the energy source from the sensor;
    determine, using the electrical parameter, a power-production capability of the energy source comprising a plurality of component energy sources, wherein determining the power-production capability of the energy source further comprises:
        determining a plurality of component energy capabilities representing energy capabilities of each component energy source of the plurality of component energy sources; and
        identifying a lowest component energy capability of the plurality of component energy capabilities associated with a component energy source,
        the power-production capability of the energy source being based on the lowest component energy capability of the component energy source:
    calculate a projected power-consumption need of the electric aircraft;
    compare the determined power-production capability of the energy source to the projected power-consumption need;
    generate, in the semi-autonomous mode, as a function of the comparison of the power-production capability and the projected power-consumption need, a first power production command datum, wherein the first power production command datum is configured to alter at least one electrical parameter associated with the energy source, varying an electrical power provided by the energy source to the aileron;
    receive a pilot signal from a user; and
    generate, in the semi-autonomous mode, as a function of the pilot signal, a second power production command datum, wherein the second power production command datum is configured to alter the at least one electrical parameter associated with the energy source, varying an electrical power provided by the energy source to the propulsor.

2. The system of claim 1, wherein the electric aircraft further comprises a vertical takeoff and landing aircraft.

3. The system of claim 1, wherein the energy source further comprises a plurality of energy sources connected in series.

4. The system of claim 1, wherein the sensor further includes:
    a voltage sensor;
    a current sensor; and
    an environmental sensor.

5. The system of claim 4, wherein the voltage sensor is configured to detect the voltage of the energy source.

6. The system of claim 5, wherein the first power production command datum and the second power production command datum are transmitted to the energy source.

7. The system of claim 5, wherein the environmental sensor is configured to detect at least an element of environmental data.

8. The system of claim 7, wherein the at least an element of environmental data include:
    geospatial data;
    ambient air temperature data;
    barometric pressure data; and
    turbulence data.

9. The system of claim 1, wherein determining the power-production capability of the energy source further comprises comparing the electrical parameter to a curve, wherein the curve represents a projected evolution over time of the energy source.

10. The system of claim 9, wherein comparing the electrical parameter to a curve further comprises modifying the curve as a function of the electrical parameter.

11. The system of claim 1, wherein the projected power-consumption need of the electric aircraft is calculated as a function of a flight plan for the electric aircraft.

12. A method of in-flight operational assessment, the method comprising:
    detecting, by a sensor, an electrical parameter of an energy source of an electric aircraft, wherein the energy source is mechanically coupled to a load, wherein the load comprises an aileron and a propulsor;
    receiving, by a controller operating in a semi-autonomous mode, the electrical parameter of the energy source from the sensor;
    determining, by the controller, a power-production capability of the energy source, using the electrical parameter, wherein the energy source comprises a plurality of component energy sources, wherein determining the power-production capability of the energy source further comprises:
        determining a plurality of component energy capabilities representing energy capabilities of each component energy source of the plurality of component energy sources; and
        identifying a lowest component energy capability of the plurality of component energy capabilities associated with a component energy source,
        the power-production capability of the energy source being based on the lowest component energy capability of the component energy source;
    calculating, by the controller, a projected power-consumption need of the electric aircraft;
    comparing, by the controller, the determined power-production capability of the energy source to the projected power-consumption need;
    generating, by the controller, in the semi-autonomous mode, as a function of the comparison of the power-production capability and the projected power-consumption need, a first power production command datum, wherein the first power production command datum is configured to alter at least one electrical parameter associated with the energy source, varying an electrical power provided by the energy source to the aileron;

receiving, by the controller, a pilot signal from a user; and generating, by the controller, in the semi-autonomous mode, as a function of the pilot signal, a second power production command datum, wherein the second power production command datum is configured to alter the at least one electrical parameter associated with the energy source, varying an electrical power provided by the energy source to the propulsor.

13. The method of claim 12, wherein detecting the electrical parameter further comprises detecting, by a voltage sensor, a voltage level.

14. The method of claim 12, wherein detecting the electrical parameter further comprises detecting, by a current sensor, a current level.

15. The method of claim 12, wherein detecting the electrical parameter further comprises detecting, by an environmental sensor, an element of environmental data.

16. The method of claim 12, wherein determining the power-production capability further comprises comparing the electrical parameter to a curve, wherein the curve represents a projected evolution over time of the energy source.

17. The method of claim 16, wherein comparing the electrical parameter to a curve further comprises modifying the curve as a function of the electrical parameter.

18. The method of claim 12, wherein determining the power-production capability of the energy source further comprises:

determining the power-production capability of each energy source of a plurality of energy sources.

19. The method of claim 12, wherein calculating the projected power-consumption need of the electric aircraft is performed as a function of a flight plan for the electric aircraft.

20. The system of claim 1, wherein each component energy source of the plurality of component energy sources comprises a battery cell.

\* \* \* \* \*